(12) United States Patent
Tokumoto et al.

(10) Patent No.: US 11,843,752 B2
(45) Date of Patent: Dec. 12, 2023

(54) INFORMATION PROCESSING APPARATUS, CONTROL METHOD, AND STORAGE MEDIUM

(71) Applicant: CANON KABUSHIKI KAISHA, Tokyo (JP)

(72) Inventors: Hirokazu Tokumoto, Chiba (JP); Masaki Kawanishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/686,297

(22) Filed: Mar. 3, 2022

(65) Prior Publication Data

US 2022/0294930 A1    Sep. 15, 2022

(30) Foreign Application Priority Data

Mar. 10, 2021  (JP) .................................. 2021-038671
Dec. 17, 2021  (JP) .................................. 2021-204792

(51) Int. Cl.
*H04N 1/44*  (2006.01)
*G06F 3/12*  (2006.01)

(52) U.S. Cl.
CPC ......... *H04N 1/4433* (2013.01); *G06F 3/1204* (2013.01); *G06F 3/1238* (2013.01); *G06F 3/1243* (2013.01); *H04N 1/4413* (2013.01)

(58) Field of Classification Search
CPC .................................................. H04N 1/4433
USPC ........................................................ 358/1.14
See application file for complete search history.

(56) References Cited

U.S. PATENT DOCUMENTS

| | | | | |
|---|---|---|---|---|
| 2001/0012122 A1* | 8/2001 | Ueda | ..................... | G06F 3/1222 358/1.15 |
| 2002/0176101 A1* | 11/2002 | Tsunekawa | ............ | G06K 15/00 358/1.9 |
| 2013/0033721 A1* | 2/2013 | Miyamoto | ............ | G06F 3/1267 358/1.14 |
| 2018/0227446 A1* | 8/2018 | Yamamoto | ......... | H04N 1/00095 |

FOREIGN PATENT DOCUMENTS

JP    2018129676 A    8/2018

* cited by examiner

*Primary Examiner* — Jacky X Zheng
(74) *Attorney, Agent, or Firm* — Canon U.S.A., Inc. I.P. Division

(57) ABSTRACT

An information processing apparatus capable of communicating with an image forming apparatus, includes one or more memories, and one or more processors that execute a set of instructions to accept a designation of a document to be registered in the image forming apparatus, determine whether the designated document is allowed to be registered, and in a case where it is determined that the designated document is not allowed to be registered, issue a notification regarding the registration of the designated document.

11 Claims, 26 Drawing Sheets

FIG. 10A

```
PRINTING OF TEMPLATE DOCUMENT                        1009        1010
┌─────────────────────────────────────────────────────────────────────┐
│ REGISTERING OF NEW BUTTON                         [ OK ]  [ CANCEL ]│
│ BASIC SETTING                       1002                            │
│   BUTTON NAME:      [ Form1        ]        (UP TO 20 CHARACTERS)   │
│   FILE PATHNAME:    [ C:\tmp\AAA.pdf ]      [ SEARCH... ]~1004      │
│                                         1003                       │
│   TYPE OF TEMPLATE DOCUMENT:  ● PERSONAL DOCUMENT                   │
│                               ○ SHARED DOCUMENT  ~1005              │
│ PRINT SETTING                                                       │
│   SIDES TO BE PRINTED:   ● BOTH SIDES   ~1006                       │
│                          ○ SINGLE SIDE                              │
│                          ○ AUTOMATIC (COLOR/BLACK AND WHITE) ~1007  │
│   COLOR MODE:            ● COLOR                                    │
│                          ○ MONOCHROME                               │
│              1008                                                   │
│   NUMBER OF COPIES:     [ 3 ]  (1 TO 9999)                          │
└─────────────────────────────────────────────────────────────────────┘
```

FIG. 10B

```
PRINTING OF TEMPLATE DOCUMENT
┌─────────────────────────────────────────────────────────────────────┐
│ REGISTERING OF NEW BUTTON       1011         [ OK ]    [ CANCEL ]   │
│   ╭───────────────────────────────────────────────────────╮         │
│   │     PASSWORD-PROTECTED DOCUMENT IS                    │         │
│   │  TRIED TO BE REGISTERED AS A SHARED DOCUMENT.         │         │
│   │ INPUTTING OF THE PASSWORD WILL BE REQUIRED WHEN       │         │
│   │          THIS DOCUMENT IS PRINTED.                    │         │
│   │  DO YOU WANT TO REGISTER IT AS A SHARED DOCUMENT?     │         │
│   │                  1012         1013                    │         │
│   │              [ YES ]        [ NO ]                    │         │
│   ╰───────────────────────────────────────────────────────╯         │
│   SIDES TO BE PRINTED:   ○ BOTH SIDES                               │
│                          ● SINGLE SIDE                              │
│                          ○ AUTOMATIC (COLOR/BLACK AND WHITE)        │
│   COLOR MODE:            ○ COLOR                                    │
│                          ● MONOCHROME                               │
│   NUMBER OF COPIES:     [ 1 ]  (1 TO 9999)                          │
└─────────────────────────────────────────────────────────────────────┘
```

| DATE AND TIME 1102 | USERNAME 1103 | STORAGE LOCATION 1104 | PRINT JOB NAME 1105 | PRINT SETTINGS 1106 | PRINT JOB TYPE 1107 | PASSWORD 1108 | SCHEDULED TIME 1109 | BUTTON NAME 1110 | TYPE OF TEMPLATE DOCUMENT 1111 |
|---|---|---|---|---|---|---|---|---|---|
| 11/10/2017 10:34:45 | User1 | /data/User1/doc1 | AAA.pdf | BOTH SIDES, 3 COPIES, COLOR | TEMPLATE DOCUMENT | | | Form1 | PERSONAL | ~1121
| 11/10/2017 13:50:22 | User1 | /data/User1/doc2 | BBB.pdf | SINGLE SIDE, ONE COPY, MONOCHROME | TEMPLATE DOCUMENT | | | Form2 | SHARED | ~1122

| DATE AND TIME 1102 | USERNAME 1103 | STORAGE LOCATION 1104 | PRINT JOB NAME 1105 | PRINT SETTINGS 1106 | PRINT JOB TYPE 1107 | PASSWORD 1108 | SCHEDULED TIME 1109 | BUTTON NAME 1110 | TYPE OF TEMPLATE DOCUMENT 1111 |
|---|---|---|---|---|---|---|---|---|---|
| 11/10/2017 10:34:45 | User1 | /data/User1/doc1 | AAA.pdf | BOTH SIDES, 3 COPIES, COLOR | TEMPLATE DOCUMENT | | | Form1 | PERSONAL | ~1121
| 11/10/2017 13:50:22 | User1 | /data/User1/doc2 | BBB.pdf | SINGLE SIDE, ONE COPY, MONOCHROME | TEMPLATE DOCUMENT | | | Form2 | SHARED | ~1122
| 11/10/2017 14:10:00 | User1 | /data/User1/doc3 | CCC.doc | BOTH SIDES, 5 COPIES, COLOR | NORMAL | | | | | ~1123
| 11/10/2017 14:12:00 | User1 | /data/User1/doc4 | DDD.doc | SINGLE SIDE, 3 COPIES, COLOR | SECURE | 111 | | | | ~1124
| 11/10/2017 14:13:00 | User1 | /data/User1/doc5 | EEE.doc | SINGLE SIDE, 2 COPIES, MONOCHROME | ENCRYPTED SECURE | 222 | | | | ~1125
| 11/10/2017 14:14:00 | User1 | /data/User1/doc6 | FFF.doc | SINGLE SIDE, 2 COPIES, COLOR | SCHEDULED PRINTING | | 11/11/2017 03:00 | | | ~1126
| 11/10/2017 14:15:00 | User2 | /data/User2/doc1 | GGG.doc | SINGLE SIDE, 3 COPIES, COLOR | NORMAL | | | | | ~1127

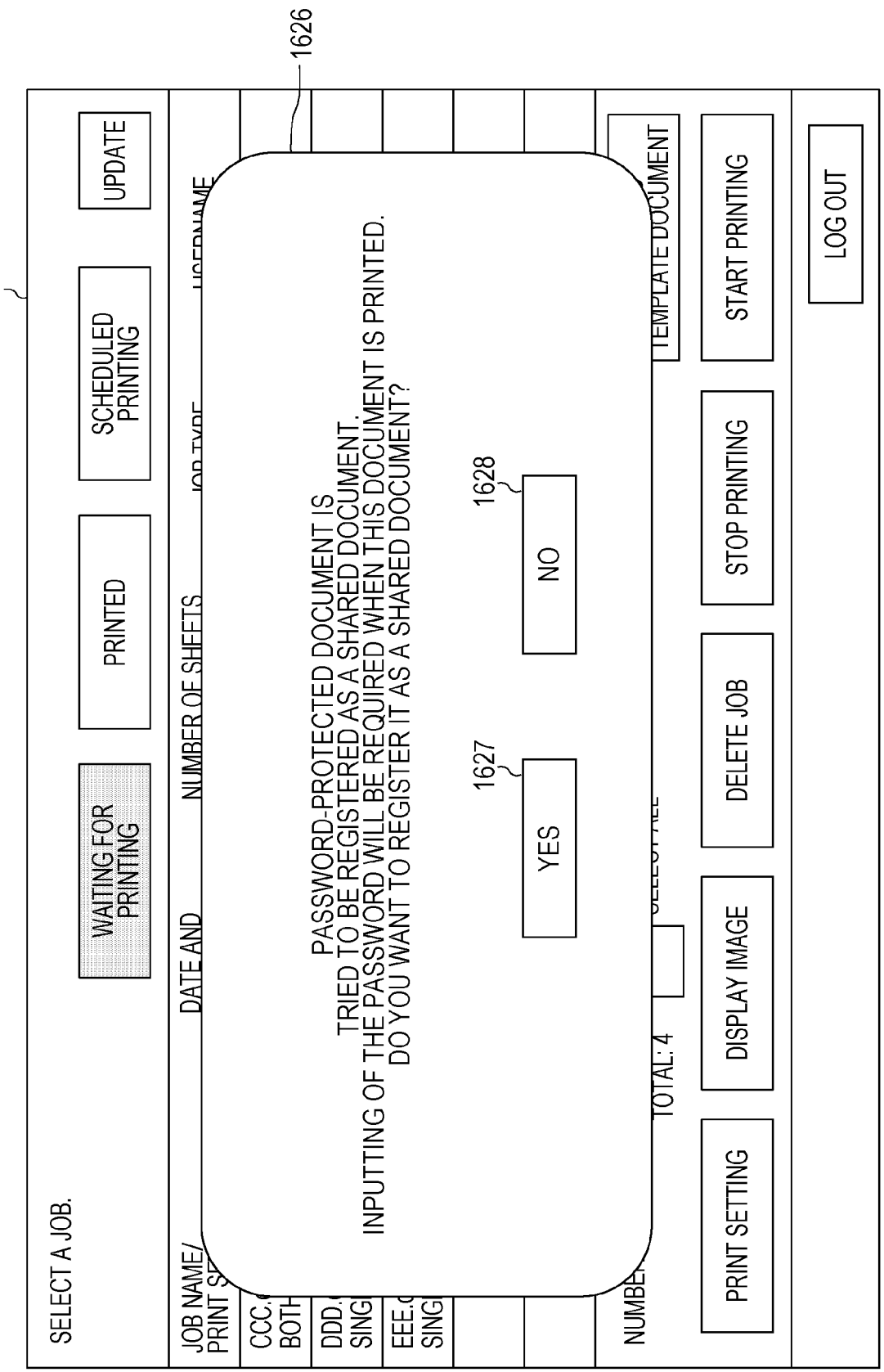

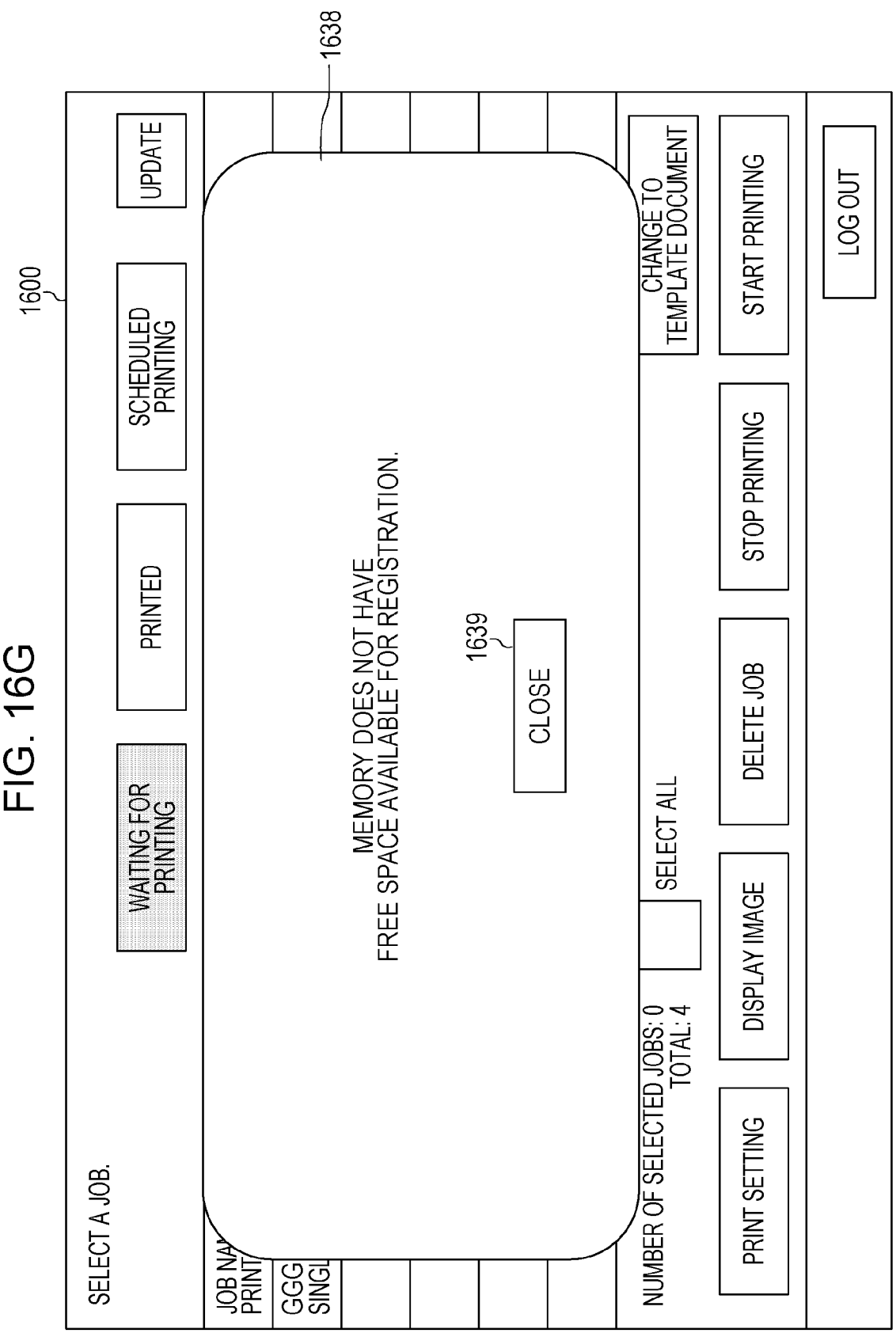

FIG. 17A

THE JOB WILL BE DELETED AFTER PRINTING IS EXECUTED AT THE SCHEDULED TIME. —1700

| WAITING FOR PRINTING —1701 | PRINTED —1702 | SCHEDULED PRINTING —1703 | UPDATE —1704 |

| JOB NAME —1705 | DATA OF PRINTING —1706 | NUMBER OF SHEETS × NUMBER OF COPIES —1707 | USERNAME —1708 |
| --- | --- | --- | --- |
| FFF.doc | 11/11/2017 03:00 | 180 × 1 | User1 —1711 |

TOTAL NUMBER OF JOBS: 3    DELETE DATA —1709    CHANGE TO TEMPLATE DOCUMENT —1710

FIG. 17B

THE JOB WILL BE DELETED AFTER PRINTING IS EXECUTED AT THE SCHEDULED TIME. —1700

IF THE DOCUMENT IS CHANGED TO A DOCUMENT TEMPLATE, IT WILL NOT BE PRINTED AT THE SCHEDULED TIME. DO YOU WANT TO CHANGE IT TO A TEMPLATE DOCUMENT? —1720

| REGISTER AS A SHARED DOCUMENT —1721 | REGISTER AS A PERSONAL DOCUMENT —1722 | CANCEL —1723 |

INFORMATION PROCESSING APPARATUS, CONTROL METHOD, AND STORAGE MEDIUM

BACKGROUND

Field of the Disclosure

The present disclosure relates to an information processing apparatus capable of communicating with an image forming apparatus, a control method, and a storage medium.

Description of the Related Art

To easily print a document as required, which is frequently or repeatedly printed, it is known to use a function called template document printing (see, for example, Japanese Patent Laid-Open No. 2018-129676).

In the function of the template document printing, a document frequently or repeatedly printed is registered and stored in advance as a template document in an image forming apparatus or the like. When a template document is registered, a button associated in a one-to-one manner with the registered template document is displayed on a home screen on the image forming apparatus such that the button is usable in printing the registered template document. The user is allowed to print the document registered as the template document by pressing the button displayed on the home screen.

When a template document is registered, it is allowed to select the type of the template document (a shared document or a personal document). Shared documents are allowed to be accessed and printed by a user other than registrants of template documents. For example, a document with a specific fixed format such as an application form is registered as a shared document by an administrator, and the shared document is allowed to be printed by a person who wants to print it when he/she wants to print it. Personal documents are allowed to be accessed and printed only by registrants of template documents. An example of a manner of using a personal document is such that a document to be printed repeatedly is registered as a personal document and the registered document is printed by a person who registered it when he/she wants to print it.

Registration of template documents is allowed to be performed by an administrator user who has administrative privileges or a general user who does not have administrator authority. An example of a method of registering a template document is to access an image forming apparatus using a web browser and register a file in a format of JPEG or PDF. Note that JPEG is an abbreviation for Joint Photographic Experts Group, and PDF is an abbreviation for Portable Document Format. The image forming apparatus has a web server function. Using this web server function, a screen of a remote UI (User Interface), which is software for managing the image forming apparatus, is displayed by specifying a URL (for example, an IP address) of the image forming apparatus on a web browser. An application for printing a template document is selected from the remote UI, and a desired file is registered as a template document in the image forming apparatus.

Another example of a method for registering a template document is to register a print job stored in the image forming apparatus as a template document. The image forming apparatus has a hold printing function in which when the image forming apparatus receives a printing job, the print job is retained in a non-volatile storage area of the image forming apparatus without being immediately subjected to printing, but printing of the print job is performed later when a user issues a print instruction via an operation unit of the image forming apparatus. In the hold printing, retained print jobs may be displayed in a print job list. A user may select a print job from the print job list and may perform an operation to register the selected print job as a template document. As a result, the selected print job is stored as a template document in the image forming apparatus.

In the technique disclosed in Japanese Patent Laid-Open No. 2018-129676 described above, when a user registers a document as a template document in the image forming apparatus, a situation may occur as described below.

For example, when a document with a large file size is tried to be registered as a template document, if the file size is larger than a free storage space available in the image forming apparatus, the registration will fail. Another possible situation is that even in a case where a document can be stored in the image forming apparatus, if the file size is greater than a maximum file size that can be printed, printing of the document will fail.

Still another possible situation is that when a password-protected document is registered as a template document, if a person different from a person who has registered the document tries to print the template document printing will fail unless the person gets the password for the printing from the person who has registered the document.

SUMMARY

Thus, when a user tries to register a specific document, if there is some restriction on use of the document, it is desirable to inform the user of the restriction before the user performs an operation of registering the document.

According to some embodiments, the present disclosure provides an information processing apparatus capable of communicating with an image forming apparatus, including one or more memories, and one or more processors that execute a set of instructions to accept a designation of a document to be registered in the image forming apparatus, determine whether the designated document is allowed to be registered, and in a case where it is determined that the designated document is not allowed to be registered, issue a notification regarding the registration of the designated document.

Further features of the present disclosure will become apparent from the following description of exemplary embodiments with reference to the attached drawings.

BRIEF DESCRIPTION OF THE DRAWINGS

FIGS. 10A to 10D each are a diagram illustrating a registration screen for registering a new button for template document printing.

FIGS. 11A and 11B each are diagram illustrating a bibliographic information list.

FIG. 16C is a diagram showing an example of a warning screen.

FIG. 16G is a diagram illustrating an example of a prohibition screen.

FIGS. 17A and 17B each are a diagram illustrating an example of a screen for displaying a scheduled print job list.

DESCRIPTION OF THE EMBODIMENTS

Embodiments of the present disclosure are described below with reference to the drawings.
First Embodiment In a first embodiment, an example of registering a template document in an image forming apparatus 102 from a PC 101 is described. The image forming apparatus 102 has a web server function. This web server function allows the PC 101 to display a remote UI screen for remotely controlling the image forming apparatus 102, which is displayed when a URL of the image forming apparatus 102 is specified on a browser on the PC 101. Using the remote UI, the PC 101 is allowed to select an application for printing a template document, and register a desired file as a template document in the image forming apparatus 102. When the template document is tried to be registered in the image forming apparatus 102, a determination is made as to whether this document is allowed to be registered as a template document. In a case where a result of the determination indicates that the document is not allowed to be registered as a template document, the user is notified that the document is not allowed to be registered. Thus, it is possible to provide the image forming apparatus 102 having a capability of assisting a user in registering a template document and having a capability of issuing a notification such that when the user is trying to register a document as a template document although the document has a property which is not suitable for being registered as a template document, the user is notified of this fact before the registration is performed.

Figure 1:
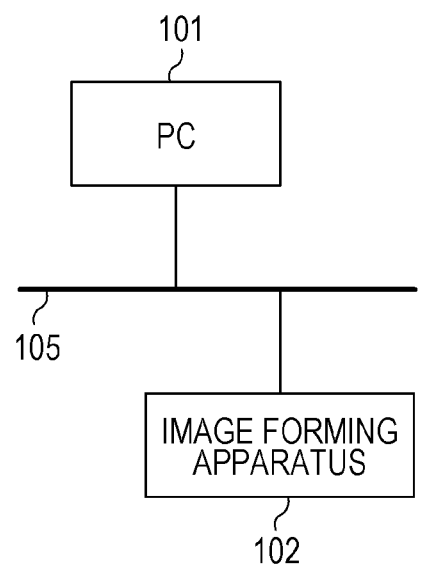
FIG. 1 is a diagram showing an example of a network configuration.

FIG. 1 is a diagram showing an example of a network configuration according to one mode of the present embodiment. A personal computer (PC) 101 for submitting a print job and an image forming apparatus 102 for processing the submitted print job are connected to the LAN 105. The PC 101 and the image forming apparatus 102 are connected to each other such that they are allowed to communicate with each other. The numbers of connected PCs and image forming apparatuses are not limited to those in this example. The image forming apparatus 102 manages bibliographic information for uniquely identifying the print job input from the PC 101. In this embodiment, it is assumed that the PC 101 is an apparatus that inputs a print job, but an apparatus other than the PC (for example, an information processing apparatus such as a mobile terminal or another image forming apparatus) may be used to input a print job.

When a user logs in to the image forming apparatus 102 via user authentication, the image forming apparatus 102 acquires a list of print jobs allowed to be printed by the login user and displays the acquired list. When the user selects a desired print job from the list, the image forming apparatus 102 acquires print data of the selected print job and prints it.

Figure 2:
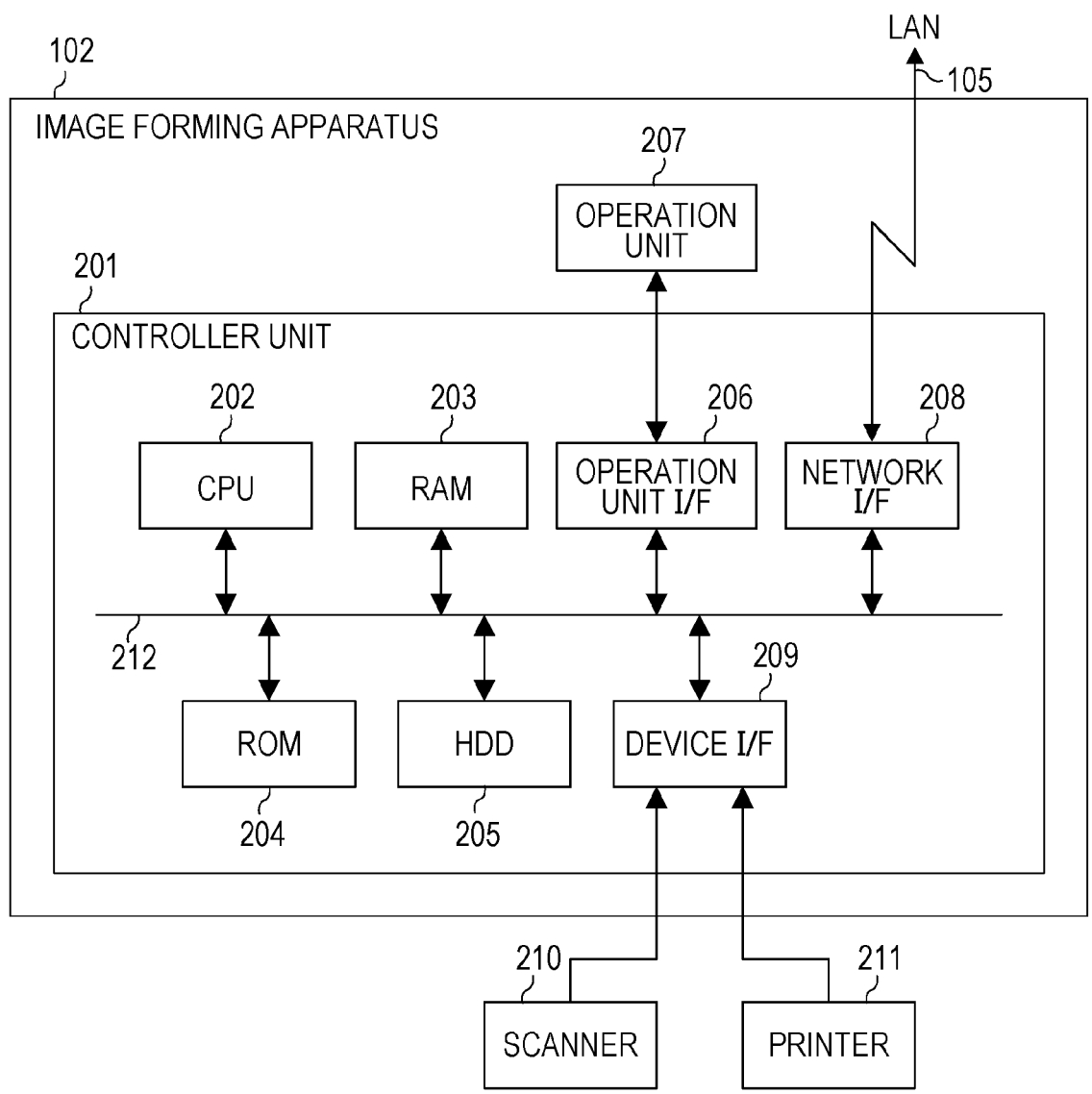
FIG. 2 is a diagram showing an overall configuration of an image forming apparatus.

FIG. 2 is a diagram showing an overall configuration of the image forming apparatus 102. In a controller unit 201 in the image forming apparatus 102, a CPU 202 is an operational processing apparatus configured to control an entire system. A RAM 203 is a system work memory used in operations by the CPU 202 and also used as an image memory for temporarily storing image data. In the RAM 203, programs such as an operating system, system software, and application software and data are also stored in the RAM 203. A ROM 204 stores a system boot program. A hard disk drive (HDD) 205 stores an operating system, system software, application software, image data, setting data, and/or the like. However, these programs and/or data may be stored in other storage apparatuses such as SSDs, SD memory cards, or eMMCs as long as they are capable of storing programs and/or data. An operation unit I/F 206 is an interface unit for interfacing with an operation unit 207. The operation unit I/F 206 outputs information to be displayed on the operation unit 207 to the operation unit 207. In addition, the operation unit I/F 206 accepts information input by a user from the operation unit 207. A network I/F 208 connects to a network (LAN) 105 and inputs/outputs information to/from a PC or another image forming apparatus connected on the same LAN. A device I/F 209 connects input/output devices such as a scanner 210 and a printer 211 to the controller unit 201 thereby making it possible to input/output image data. The above-described devices are disposed on a system bus 212.

Figure 3:
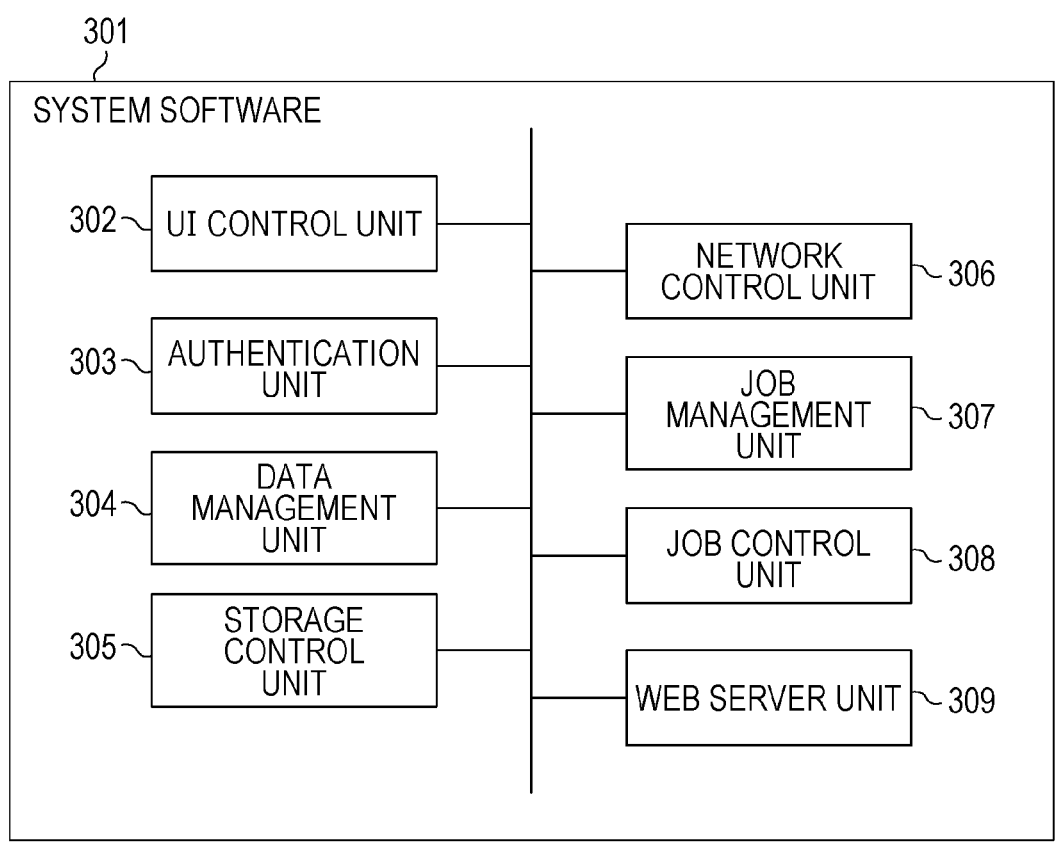
FIG. 3 is a diagram showing a functional configuration of system software of an image forming apparatus.

FIG. 3 is a diagram showing a functional configuration of system software of the image forming apparatus 102. The system software 301 is stored in one of the following storage units, the RAM 203, the ROM 204, and the HDD 205. The system software 301 is executed by the CPU 202.

The UI control unit 302 receives via the operation unit I/F 206 information input by a user using the operation unit 207, and transmits the received information to an authentication unit 303, a data management unit 304, and a job management unit 307. When the UI control unit 302 receives a response from the authentication unit 303, the data management unit 304, and/or the job management unit 307, the UI control unit 302 outputs the received information to the operation unit 207 via the operation unit I/F 206.

The authentication unit 303 performs a user authentication process based on authentication information received from the UI control unit 302, and returns a result of the authentication process. The data management unit 304 receives a data write/read request from the UI control unit 302, a network control unit 306, the job management unit 307, and/or a web server unit 309, and sends the data write/read request to a storage control unit 305. When the data management unit 304 receives a response from the storage control unit 305, the data management unit 304 sends the received response information to the UI control unit 302, the network control unit 306, the job management unit 307, and/or the web server unit 309.

The storage control unit 305 receives a data write/read request from the data management unit 304, and writes/reads data to/from the HDD 205, and returns a result thereof to the data management unit 304. The network control unit 306 receives a request from the PC 101 or an arbitrary image forming apparatus connected on the LAN 105 via the network I/F 208. In response to the received request, the network control unit 306 issues a request for processing to the data management unit 304, the job management unit 307, and/or the web server unit 309. The network control unit 306 receives a response from the data management unit 304, the job management unit 307, and/of the web server unit 309. The network control unit 306 transmits the received response to the PC 101 or an arbitrary image forming apparatus connected on the LAN 105 via the network I/F 208.

The job management unit 307 receives a job execution request from the UI control unit 302, the network control unit 306, and/or the web server unit 309, and manages the job. The job management unit 307 requests the job control unit 308 to execute the job. The job management unit 307 transmits a data write/read request to the data management unit 304. The job management unit 307 receives a response from the data management unit 304 and/or the job control unit 308, and transmits a job status to the UI control unit 302, the network control unit 306, and/or the web server unit 309.

The job control unit 308 receives a job execution request from the job management unit 307, and controls operations of the scanner 210 and/or the printer 211 via the device I/F 209. The job control unit 308 receives an operation status of the scanner 210 and/or the printer 211 via the device I/F 209, and sends the received operation status to the job management unit 307.

The web server unit 309 receives an HTTP (Hyper Text Transfer Protocol) request from the network control unit. The web server unit 309 analyzes the received data, and requests the data management unit 304 and/or the job management unit 307 to perform processing according to the analysis result. The web server unit 309 receives a response from the data management unit 304 and/or the job management unit 307. The web server unit 309 transmits the received response to the network control unit.

Figure 4:
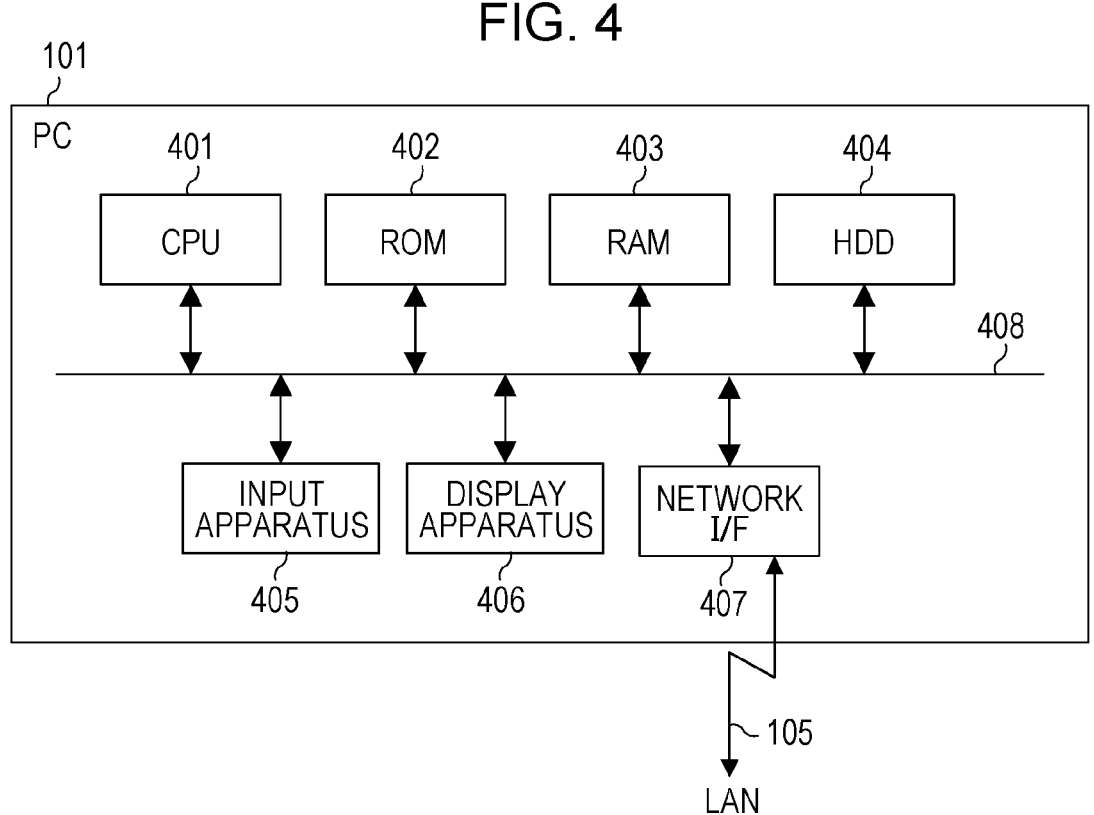
FIG. 4 is a diagram showing an overall configuration of a PC.

FIG. 4 is a diagram showing an overall configuration of the PC 101. In the PC 101, a CPU 401 is an operational processing apparatus that controls the entire system. A ROM 402 stores programs and data related to respective various processes. A RAM 403 is a system work memory used by the CPU in operations, and is used as a storage memory for storing temporary data in processes. A hard disk drive (HDD) 404 stores a program and data related to each process, temporary data, application data, and the like. An input apparatus 405 is a keyboard or a pointing device for accepting an instruction input to the apparatus. A display apparatus 406 displays an operation status of the apparatus and information output by a program executed on the apparatus. A network I/F 407 is connected to the network (LAN) 105, and functions to input/output information to/from another PC and/or image forming apparatus connected on the same LAN. The above-described elements are disposed on a system bus 408.

Functions of the operating system (OS) or the printer driver (or processing performed by the OS or the printer driver) are realized by the CPU 401 by executing processing according to programs of the OS, the printer driver, or the application stored in the HDD 404.

Figure 5:
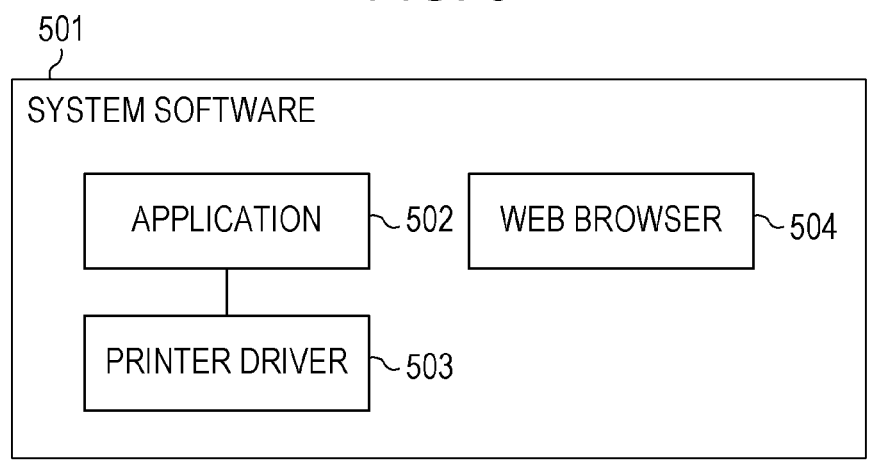
FIG. 5 is a diagram showing a configuration of system software of a PC.

FIG. 5 is a diagram illustrating a configuration of system software of the PC 101. The system software 501 is stored in a storage unit such as the ROM 402, the RAM 403, or the HDD 404, and is executed by the CPU 401.

The system software 501 includes an application 502, a printer driver 503, and a web browser 504. The application 502 is a tool, for example, for creating or editing an image or a document by using the input apparatus 405 such as a pointing device or a keyboard while viewing the display apparatus 406 of the PC 101. A user creates data of an image or a document using the application 502 and creates print command data using the printer driver 503, and transmits the resultant data to an apparatus having a printing capability such as the image forming apparatus 102. The web browser 504 requests the web server to provide a web content. The web browser 504 also has a capability of analyzing the HTML (Hyper Text Markup Language) of the web content acquired from the web server and displaying the result on the display apparatus 406, and further has a capability of analyzing and executing a JAVASCRIPT (registered trademark).

A further detailed description is given below, for example, for a case where a user registers a template document in the image forming apparatus 102 by operating the web browser 504 of the PC 101.

Figure 6:
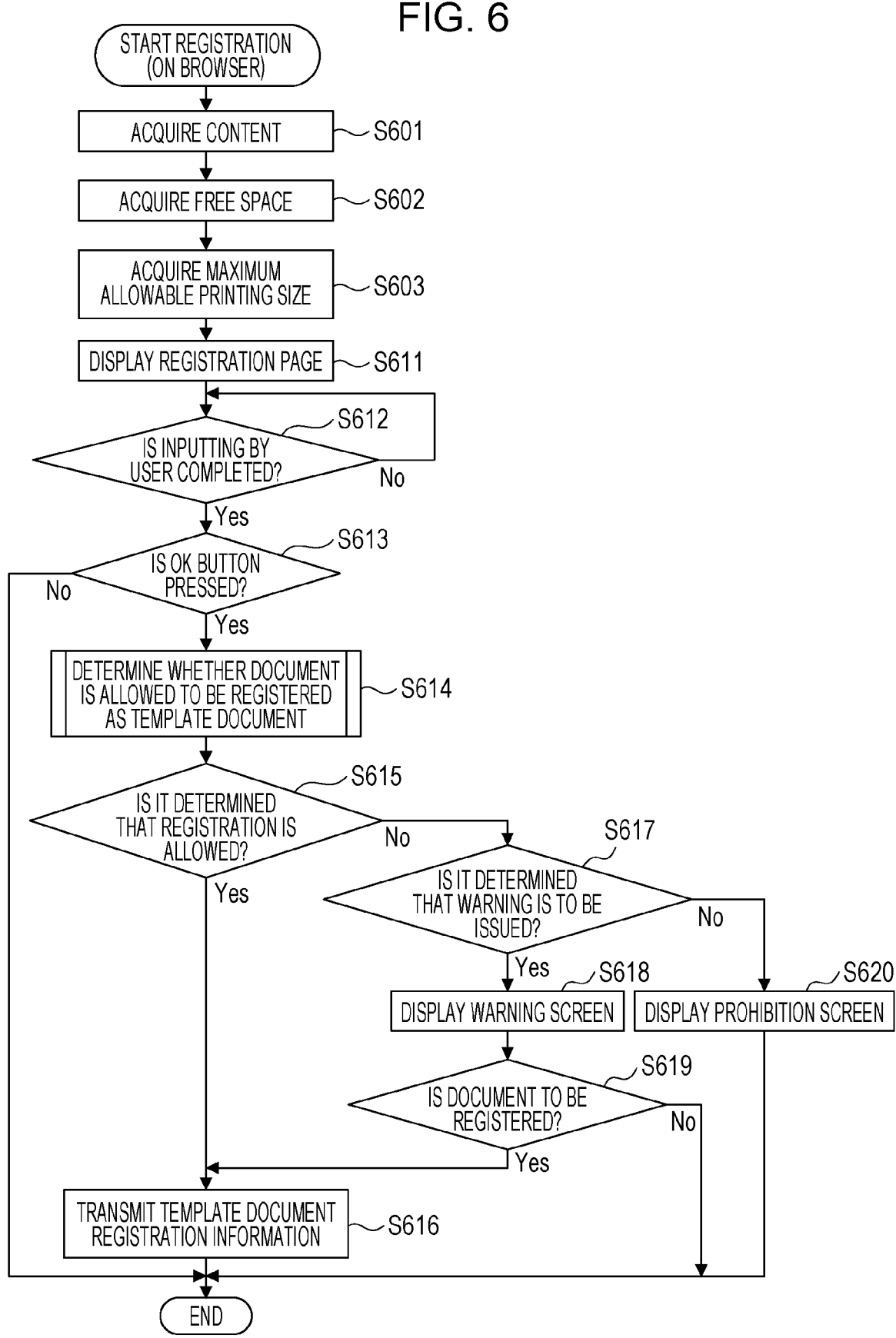
FIG. 6 is a flowchart showing a process of registering a template document.

FIG. 6 is a flowchart illustrating a process of registering a template document wherein the process is executed by the CPU 401 of the PC 101. A user registers a template document by operating the web browser 504 using the input apparatus 405 such as a pointing device or a keyboard while viewing the display apparatus 406.

The user inputs, on the web browser 504, a URL (for example, an IP address) specifying the image forming apparatus thereby displaying a remote UI screen for controlling the image forming apparatus. Thereafter, the user selects an application of printing a template document via the remote UI. The selected application is displayed on a management screen 901 for managing registration information regarding the template document printing.

The web browser 504 acquires the management screen 901 for managing the registration information regarding the template document printing as a web content from the image forming apparatus via the LAN 105 (S601). Next, the web browser 504 acquires, from the image forming apparatus, a free space available in a storage area for storing a document subjected to the template document printing (S602). Next, the web browser 504 acquires, from the image forming apparatus, an upper limit of a file size that can be printed by the image forming apparatus (S603). This makes it possible to notify the user whether or not the document is allowed to be registered at a timing earlier than in a case where S602 and S603 are performed when the document registration instruction is received from the user. Note that the processes in S602 and S603 may be performed in parallel with a process in S611 which will be described later.

Figure 9A:
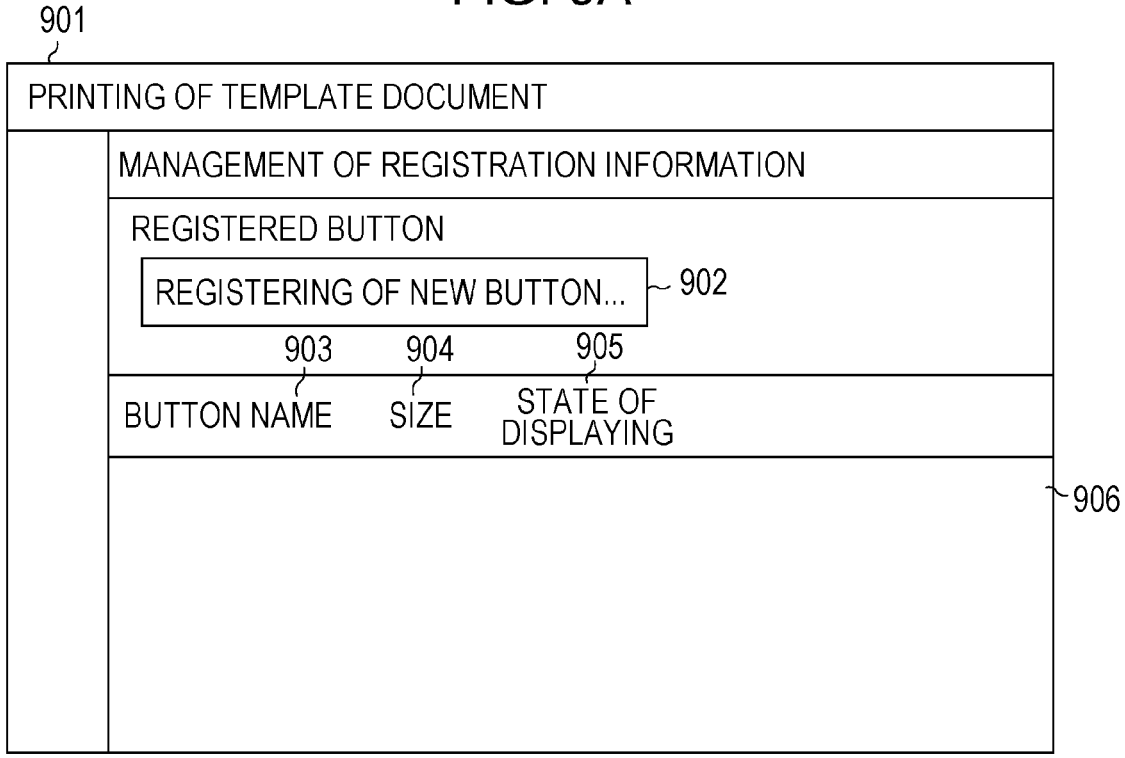
FIGS. 9A and 9B each are a screen for managing registration information regarding template document printing.

FIG. 9A illustrates an example of the management screen 901 for managing registration information regarding the template document printing. On this management screen 901, information on the registration status of the template document is displayed so as to allow a user to confirm it. The information includes a button name 903 of a button displayed on a operation panel, a document size 904, a button display status 905, and/or the like, which are associated with a registered document. In a case where no template document is registered, nothing is displayed in a display area 906. A "REGISTERING OF NEW BUTTON" button 902 for adding a new document as a template document is displayed. When the "REGISTRATION OF NEW BUTTON" button 902 is pressed, a registration screen, such as that shown in FIG. 10A, for registering a new button is displayed on the web browser 504 (S611).

FIG. 10A illustrates an example of the registration screen for registering a new button (hereinafter also referred to as the new button registration screen). On the new button registration screen, a text box 1002 for inputting a button name as a basic setting is displayed. In addition, a search button 1004 used in specifying a document to be registered and a text box 1003 for inputting and displaying a file path of the document to be registered are displayed. Furthermore, radio buttons 1005 for selecting the type of the template document to be registered are displayed. When a shared document is selected as the type, the document is registered as one that is allowed to be accessed and printed by users other than the registrant of the template document. When a personal document is selected as the type, the document is registered as one that is allowed to be accessed and printed only by the registrant of the template document. On the new button registration screen, radio buttons 1006 are displayed for specifying a side to be printed, as one of print settings. When "BOTH SIDES" is selected, a both-side printing mode is registered, while when "SINGLE SIDE" is selected, a single-side printing mode is registered. Furthermore, radio buttons 1007 for specifying a color mode are displayed. When "AUTOMATIC (COLOR/MONOCHROME)" is selected, the mode is set such that the color mode and the monochrome mode is switched depending on pages of a document. When "COLOR" is selected, the color mode is registered. When "MONOCHROME" is selected, the monochrome is registered. In addition, a text box 1008 for setting the number of copies is displayed. When an OK button 1009 is pressed, the document and the print settings input by the user are transmitted to the image forming apparatus 102, and the template document printing is registered. When a cancel button 1010 is pressed, settings input by the user input are canceled and the screen transitions to the management screen 901 for managing the registration information regarding the template document printing.

The web browser 504 waits for the inputting by the user to complete (S612). When the OK button 1009 or the cancel button 1010 is pressed, it is determined that the inputting by the user is completed. After the inputting by the user is completed, the web browser 504 determines whether the OK button 1009 is pressed (S613). When the OK button is pressed, the web browser 504 determines whether a notification is to be issued to the user (S614). When the cancel button 1010 is pressed, the process is ended.

Figure 7:
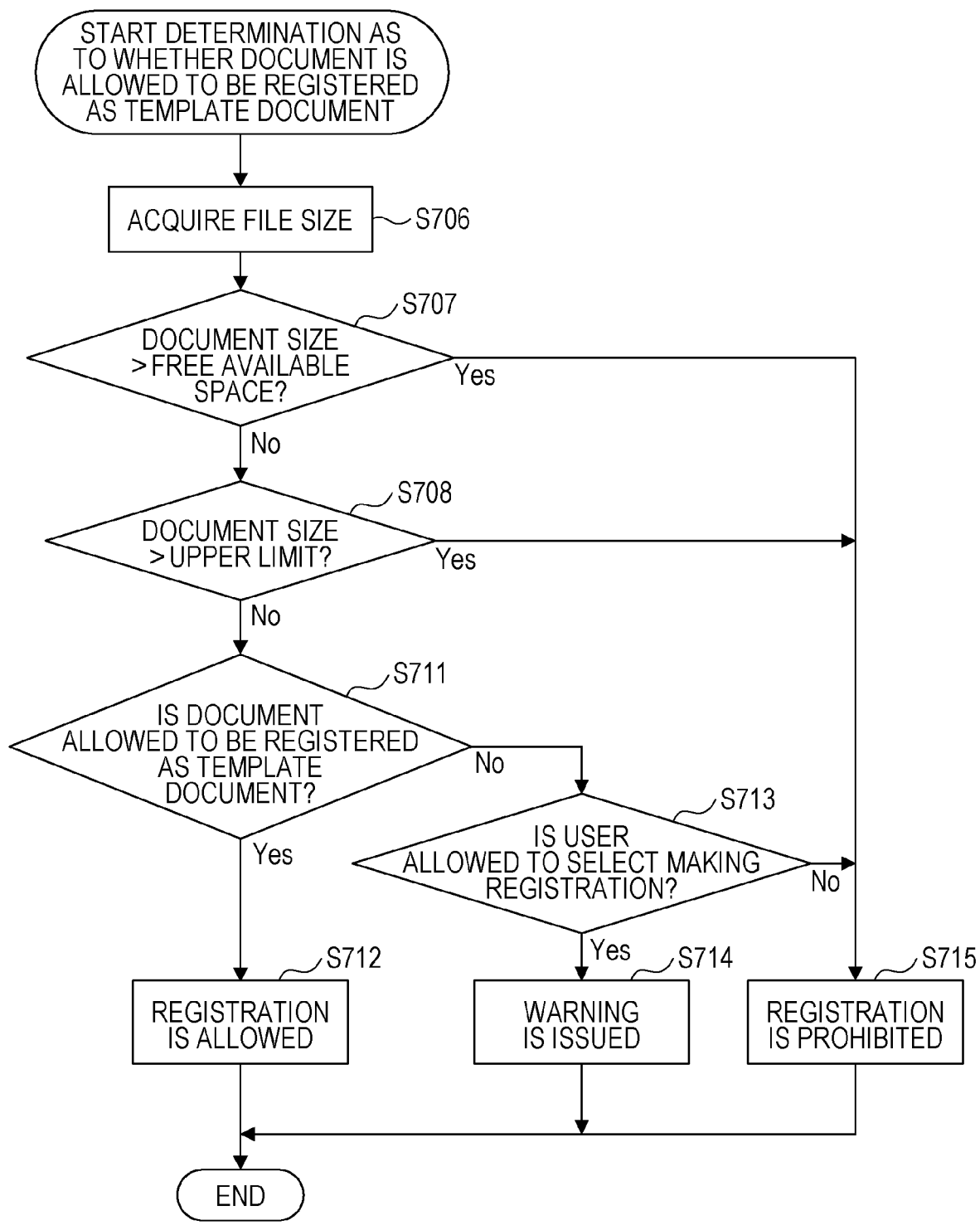
FIG. 7 is a flowchart of determining whether a template document is allowed to be registered.

FIG. 7 is a flowchart showing a process of determining whether or not a user notification is required, which is executed by the CPU 401 of the PC 101. In an example described below, it is assumed that determination information as to whether or not the user notification is necessary is transmitted in advance from the image forming apparatus 102. However, this does not limit the scope of claims of the present disclosure, but, for example, the document and/or the print setting to be registered may be transmitted to the image forming apparatus 102 and the image forming apparatus 102 may determine whether or not the user notification is necessary.

When the web browser 504 tries to register the document selected in the file path 1003 as a template document, the web browser 504 first acquires the file size of the document (S706). Next, the web browser 504 compares the file size of the document being tried to be registered with the free space available in the storage area for storing the document related to the template document printing acquired in S612 from the image forming apparatus (S707). In a case where the file size of the document is larger than the storage capacity remaining as the free space for storing the document, it is determined that the registration is prohibited (S715). Next, the web browser 504 compares the file size of the document being tried to be registered with the upper limit of the file size that can be printed by the image forming apparatus acquired in S603 from the image forming apparatus (S708). In a case where the file size of the document is larger than the upper limit, it is determined that the registration is prohibited (S715).

The web browser 504 determines whether a predetermined condition for issuing a user notification is satisfied (S711). Here, the user notification is a notification which is issued to a user when some restriction occurs on the template document registration such that the user is allowed to confirm the situation. For example, the determination is made based on whether or not the document is a password-protected document. In a case where the document is not a password-protected document, it is determined that the user notification is unnecessary at the timing of the document registration (S712). However, in a case where the document is a password-protected document, it is determined that the user notification is necessary at the timing of the document registration. The reason for issuing a user notification is that it is necessary to enter a password when a password-protected template document is tried to be printed, and thus a user who does not know the password will not be allowed to issue an instruction to print it. In a case where it is determined that the user notification is to be issued in the document registering process, the user notification is issued and a determination is made as to whether the user is allowed to select whether the document is to be registered as a template document (S713). In a case whether the user is allowed to make the selection, it is determined to issue a warning (S714). In a case where the user is not allowed to make the selection, it is determined that the registration is to be prohibited (S715). For example, in a case where the document is a password-protected document, if the template document registrant gives a notification of the password to a user who wants to access or print the document, the user is allowed to print it, and thus in this case it is determined that a warning is to be issued.

The web browser 504 confirms the result of the determination as to whether the user notification is required (S615). In a case where the user notification is not required, the web browser 504 transmits the template document registration information (in terms of the document and the print settings selected in the basic settings and the print settings) to the image forming apparatus 102 (S616). In the case where the result of the determination in S615 is that the user notification is to be issued, a further determination is made as to whether the result of the determination in S615 is that a warning is to be issued (S617). If the result of the determination in S617 is that the warning is to be issued, the web browser 504 displays a warning screen (S618).

FIG. 10B illustrates an example of the warning screen. 1011 denotes a message indicating the content of the warning. A YES button 1012 is a button for registering the template document. A NO button 1013 is a button for not registering the template document.

The web browser 504 determines whether or not an instruction to register the document is issued on the warning screen (S619). In a case where the result of the determination in S619 is that the document is to be registered (that is, in a case where the YES button 1012 is pressed on the warning screen), the web browser 504 executes the process in S616 described above. In a case where the result of the determination in S619 is that the document is not to be registered (that is, in a case where the NO button 1013 is pressed on the warning screen), the web browser 504 does not display the message 1011 indicating the content of the warning but displays an additional screen.

In a case where the result of the determination in S617 is that the warning is not to be issued but the registration of the document is to be prohibited, the web browser 504 displays a prohibition screen (S620).

Figure 10C:
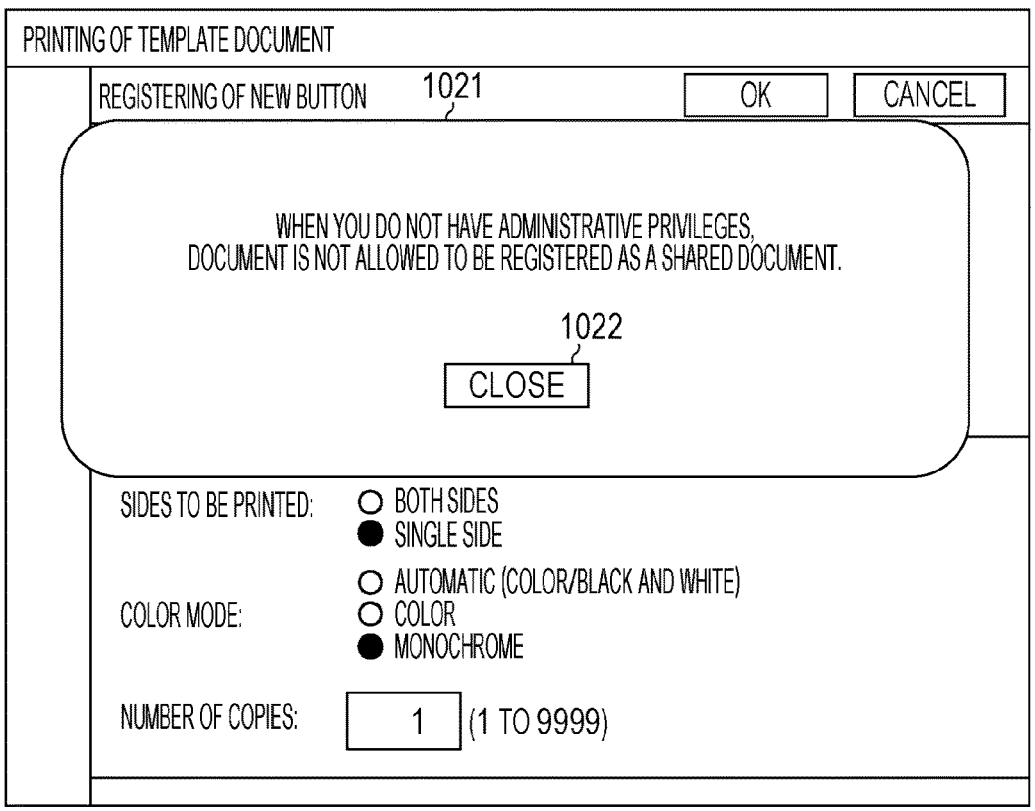

FIG. 10C illustrates an example of a prohibition screen. 1021 denotes a message indicating a content of the prohibition which is displayed when a user having no administrative privileges tries to register a document as a shared document. A CLOSE button 1022 is a button for closing the message 1021 indicating the content of the prohibition.

Figure 10D:
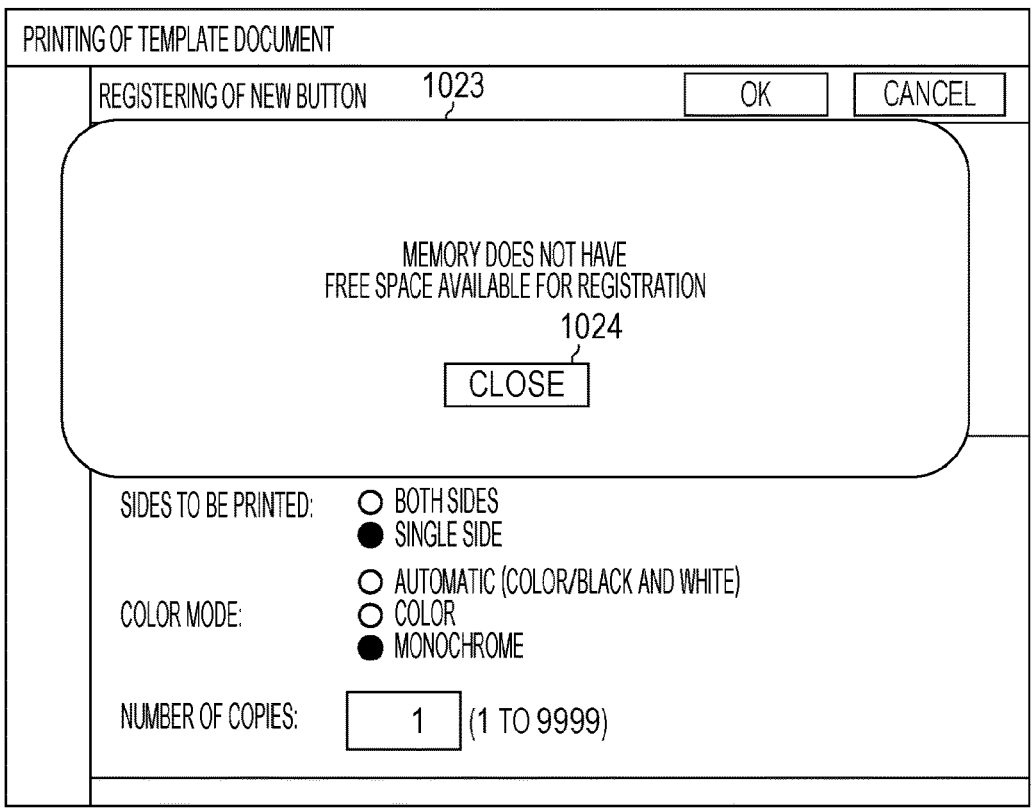

FIG. 10D illustrates an example of a prohibition screen. 1023 denotes a message indicating a content of the prohibition and more specifically indicating that the registration is not allowed because the size of the document tried to be registered is larger than the free storage space in the image forming apparatus or the memory is full or because the size of the document is larger than can be printed. A CLOSE button 1024 is a button for closing the message 1023 indicating the content of the prohibition.

Figure 9B:
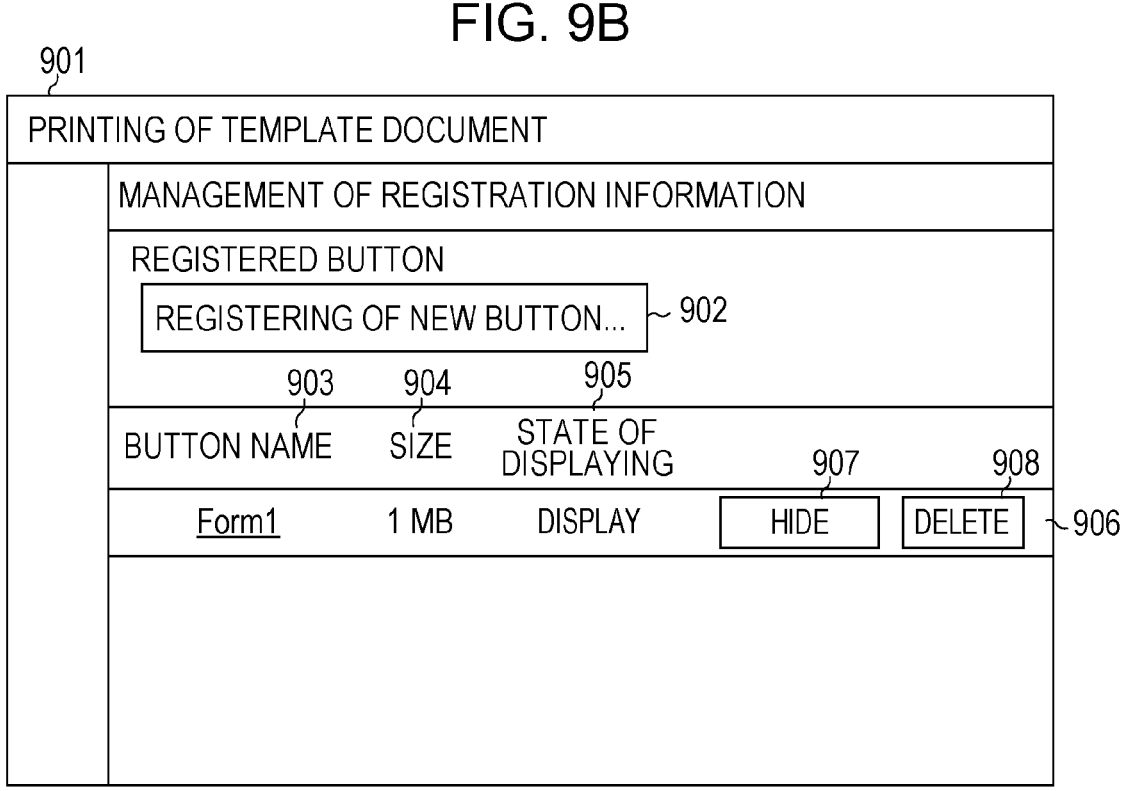

FIG. 9B illustrates a management screen 901 for managing registration information regarding template document printing. When a template document is registered, information on the registered template document is displayed in a display area 906. A HIDE button 907 is a button for hiding a template document button which will be described later. When the HIDE button 907 is pressed, the web browser 504 notifies the image forming apparatus 102 that the HIDE button 907 is pressed. In response, the image forming apparatus 102 hides a corresponding template document button. A DELETE button 908 is a button for deleting the template document button described later. When the DELETE button 908 is pressed, the web browser 504 notifies the image forming apparatus 102 that the DELETE button 908 is pressed. In response, the image forming apparatus 102 deletes information regarding the corresponding template document. Furthermore, when the DELETE button 908 is pressed, the web browser 504 deletes information regarding the corresponding template document button displayed in the display area 906.

Next, a process of registering the template document registration information transmitted from the PC 101 in the image forming apparatus 102 is described with reference to FIG. 8.

Figure 8:
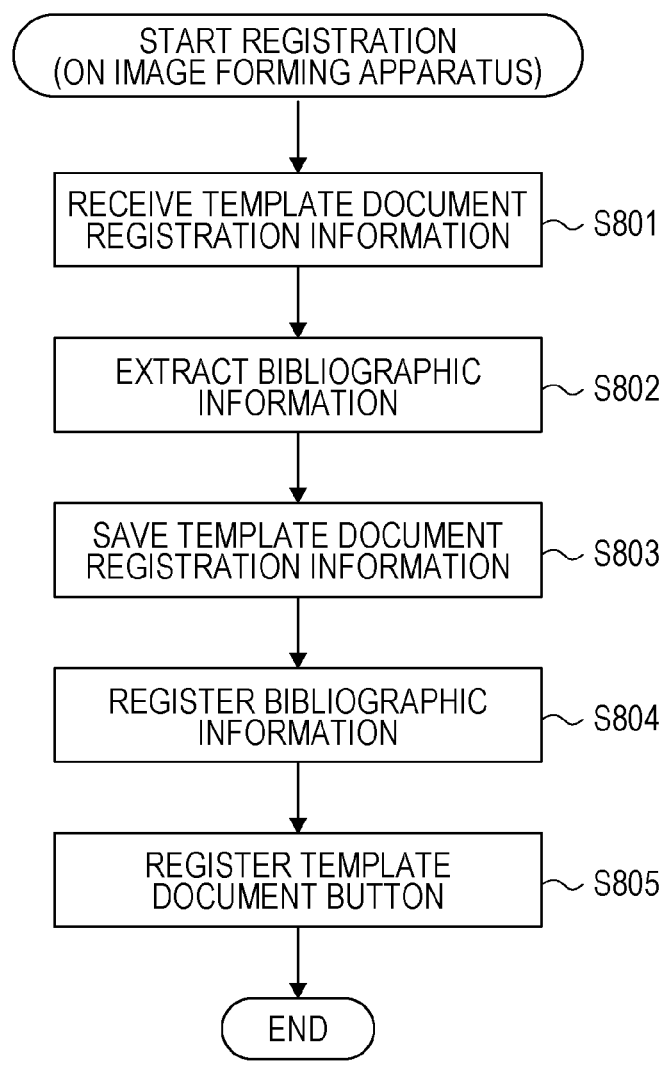
FIG. 8 is a flowchart showing a process of registering a template document.

FIG. 8 is a flowchart illustrating a template document registration process executed by the CPU 202 of the image forming apparatus 102. When the network control unit 306 receives template document registration information from the PC 101 (S801), the network control unit 306 transmits the template document registration information to the job management unit 307. When the job management unit 307 receives the template document registration information, the job management unit 307 transmits the template document registration information to the data management unit 304. The data management unit 304 analyzes the template document registration information received from the job management unit 307 and extracts bibliographic information (S802). Details of the bibliographic information will be described later. The data management unit 304 then transmits the template document registration information and the extracted bibliographic information to the storage control unit 305. The storage control unit 305 stores the received template document registration information and the extracted bibliographic information in the HDD 205 (S803, S804). Thereafter, the job management unit 307 registers a template document button registered in a button list to be displayed on the home screen.

FIG. 11A is a diagram showing an example of a bibliographic information list 1101 stored in the HDD 205. The bibliographic information list 1101 collectively manages bibliographic information regarding the template document described above and bibliographic information regarding a hold print job, which will be described later, input to the image forming apparatus 102. However, this does not limit the scope of claims of the present disclosure, but, for example, the bibliographic information regarding the template document and the bibliographic information regarding the hold print job may be managed separately. The bibliographic information list 1101 includes information regarding date and time 1102 when a template document was registered, a user name 1103 who registered the template document, a storage location 1104 where the registered template document is stored, and a template document name (in FIG. 11A, described as "print job name") 1105. The bibliographic information list 1101 further includes information regarding print settings 1106, a print job type 1107, a password 1108, a scheduled time 1109, a button name 1110, and a type of the template document 1111. The contents of the bibliographic information list 1101 are not limited to those described above. For example, the bibliographic information list 1101 may further include information indicating a paper size for a template document. 1121 and 1122 each denote specific bibliographic information registered in S804 when a template document is registered by a user with a user name of User1.

Figure 12A:
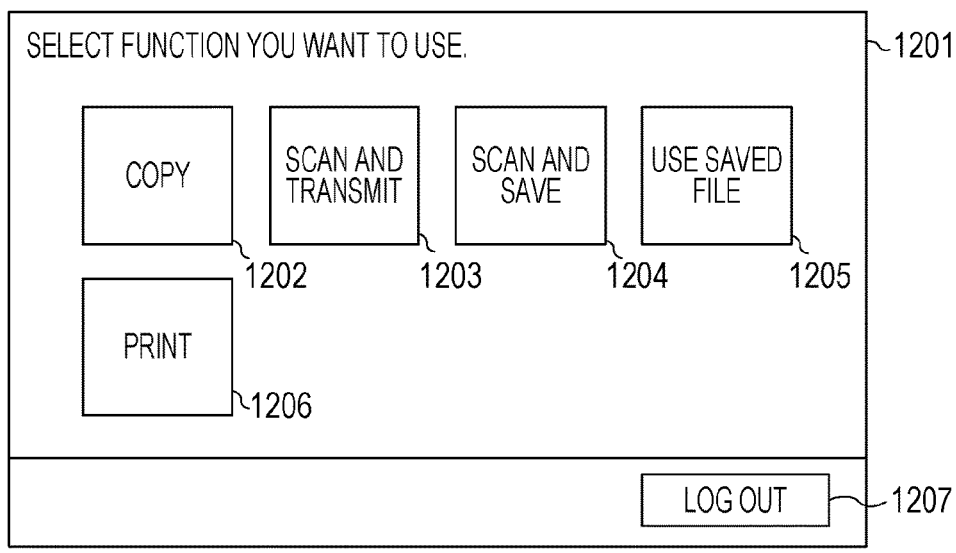
FIGS. 12A to 12C each are a diagram illustrating an example of a home screen.

FIG. 12A illustrates an example of a home screen 1201. On this screen, a user is allowed to select a function the user wants to use. When the user selects one of functions 1202 to 1206, the UI control unit 302 displays a function screen (not shown) corresponding to the selected function. In this example shown in FIG. 12A, the home screen 1201 is in a state in which any template document button is not yet registered.

Figure 12B:
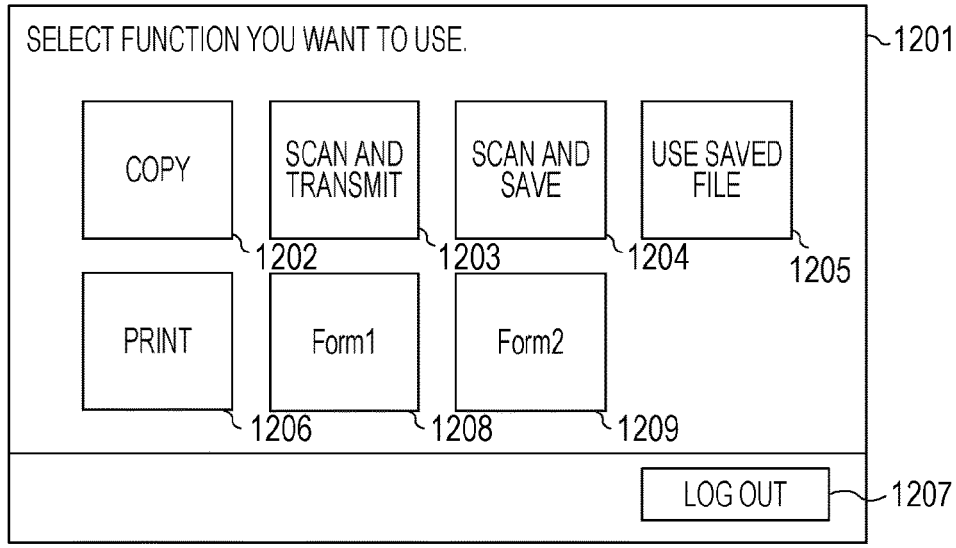

FIG. 12B illustrates another example of the home screen 1201. This example of the hose screen 1201 is displayed when template document buttons corresponding to those described in the bibliographic information list 1101 are registered. This home screen is displayed, for example, when a user with a user name of User1 logs in using an authentication screen (not shown) of the image forming apparatus 102. A Form1 button 1208 is a template document button and corresponds to bibliographic information 1121. Since a personal document is specified as the type of the template document type 1111 and the user name 1103 is User1, the Form1 button is displayed on the home screen 1201. A Form2 button 1209 is a template document button and corresponds to bibliographic information 1122. Since a shared document is specified as the template document type 1111, the Form2 button is displayed on the 1201.

Figure 12C:
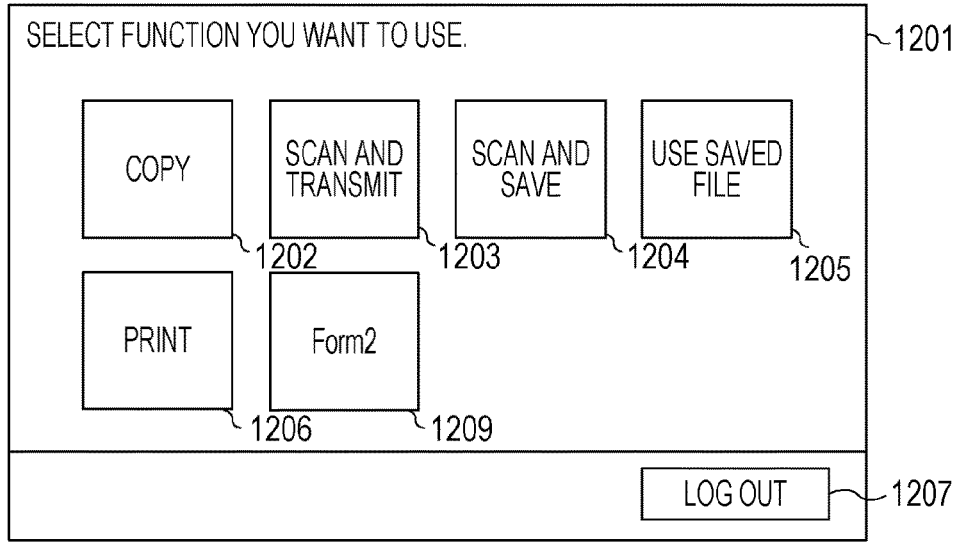

FIG. 12C illustrates another example of the home screen 1201. This example of the hose screen 1201 shown in FIG. 12C is displayed in a state in which template document buttons corresponding to those described in the bibliographic information list 1101 are registered. This home screen 1201 is displayed, for example, when a user with a user name of User2 logs in using an authentication screen (not shown) of the image forming apparatus 102. Bibliographic information 1121 is not displayed on the home screen 1201 because a personal document is specified as the template document type 1111, and the user name 1103 is User1 which does not match the user name of User1. A Form2 button 1209 is a template document button and corresponds to bibliographic information 1122. Since a shared document is specified as the template document type 1111 although the user name 1103 is User1, the Form2 button is displayed on the 1201.

In the present embodiment, as described above, when a user operates the web browser 504 on the PC 101 and tries to register a document as a template document in the image forming apparatus 102, the user is notified of items to be confirmed about a restriction that will occur when the registered document is tried to be printed. Thus, according to the present embodiment, when the user tries to register the document as a template document, the user can get to know in advance the restriction that will occur when the registered document is tried to be printed.

Second Embodiment

In the method according to the first embodiment described above, a user registers a document as a template document in the image forming apparatus 102 by operating the web browser 504 on the PC 101. In contrast, in a method according to a second embodiment described below, a print job input to the image forming apparatus 102 from the PC 101 is stored and held, and the stored print job is later changed to a template document. In this second embodiment, when a print job is input to the image forming apparatus 102 from the PC 101, printing of the input print job is not immediately performed but it is stored and held in the hard disk drive (HDD) 205 or the like provided in the image forming apparatus 102. Thereafter, the print job stored in the image forming apparatus 102 is registered as a template document by a user by operating the operation unit 207 or the like of the image forming apparatus 102. When the template document is tried to be registered in the image forming apparatus 102, a determination is made as to whether this document is allowed to be registered as a template document. In a case where a result of the determination indicates that the document is not allowed to be registered as the template document, the user is notified that the document is not allowed to be registered. That is, the image forming apparatus 102 can be configured to have a capability of assisting a user in registering a template document such that when the user tries to register a document as a template document although the document has a property which is not suitable for being registered as a template document, the user is notified of this fact before the registration is performed.

A print job submission process in which a user operates the PC 101 and submits a print job to the image forming apparatus 102 will be described.

Figure 13:
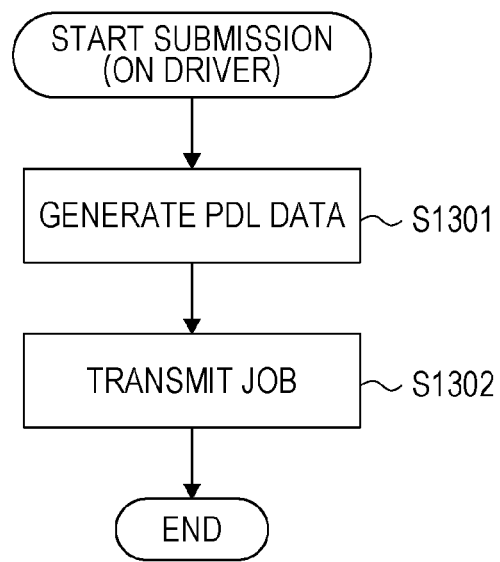
FIG. 13 is a flowchart illustrating a print job submission process.

FIG. 13 is a flowchart illustrating a print job submission process executed by the CPU 401 of the PC 101.

A user creates data such as image data or document data on the application 502 using the input apparatus 405 such as a pointing device or a keyboard while viewing the display apparatus 406, and the user issues an instruction to print the created data. The printer driver creates PDL data according to the data such as image data or document data, a document attribute such as a document name, and print setting information set in the printer driver when the print instruction is issued (S1301). When the printing is performed in a secure print or encrypted secure print mode, a password included in the print setting information is added to the PDL data. When the printing is performed in a scheduled printing mode, a scheduled time (a time at which the printing is to be started) is added to the PDL data. The resultant PDL data is transmitted as a print job to the image forming apparatus 102 (S1302).

Figure 14:
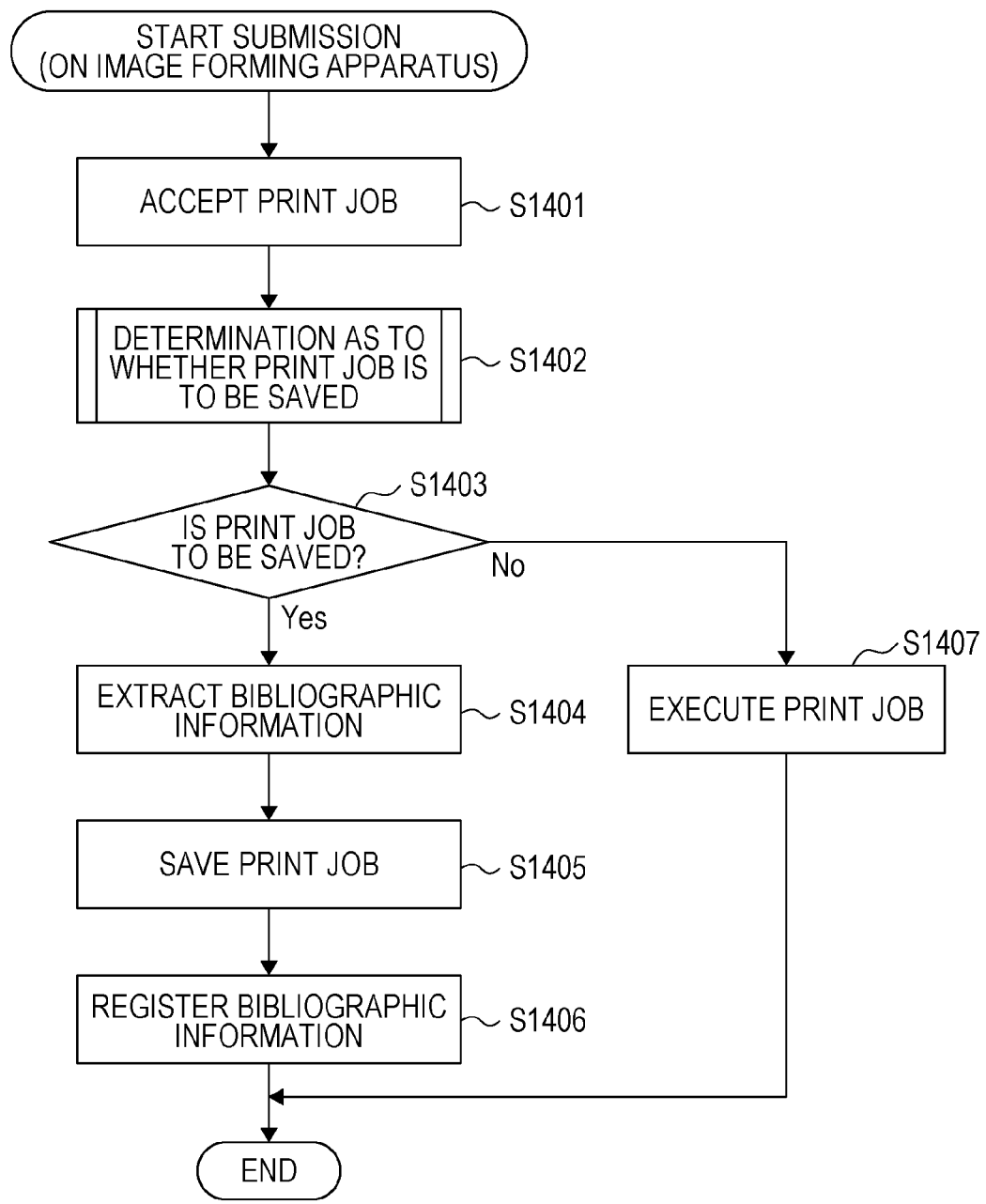
FIG. 14 is a flowchart illustrating a process of saving a print job.

FIG. 14 is a flowchart illustrating a print job saving process executed 301 by the system software 301 on the CPU 202 of the image forming apparatus 102.

When the network control unit 306 accepts the print job from the PC 101 (S1401), the network control unit 306 transmits the print job to the job management unit 307. When the job management unit 307 receives the print job, the job management unit 307 determines whether or not the print job is to be saved (S1402). Details of the process in S1402 will be described later. The job management unit 307 determines whether or not the result of the determination in S702 indicates that the print job is to be saved (S1403). In a case where the print job is not to be saved, the job management unit 307 requests the job control unit 308 to execute the print job (S1407). In response, the job control unit 308 executes printing. In a case where the print job is to be saved, the job management unit 307 transmits the print job to the data management unit 304. The data management unit 304 analyzes the print job received from the job management unit 307 and generates bibliographic information based on a result of the analysis (S1404). The data management unit 304 transmits the print job and the generated bibliographic information to the storage control unit 305. The storage control unit 305 saves the received print job and the generated bibliographic information in the HDD 205 (S1405, S1406).

Figure 15:
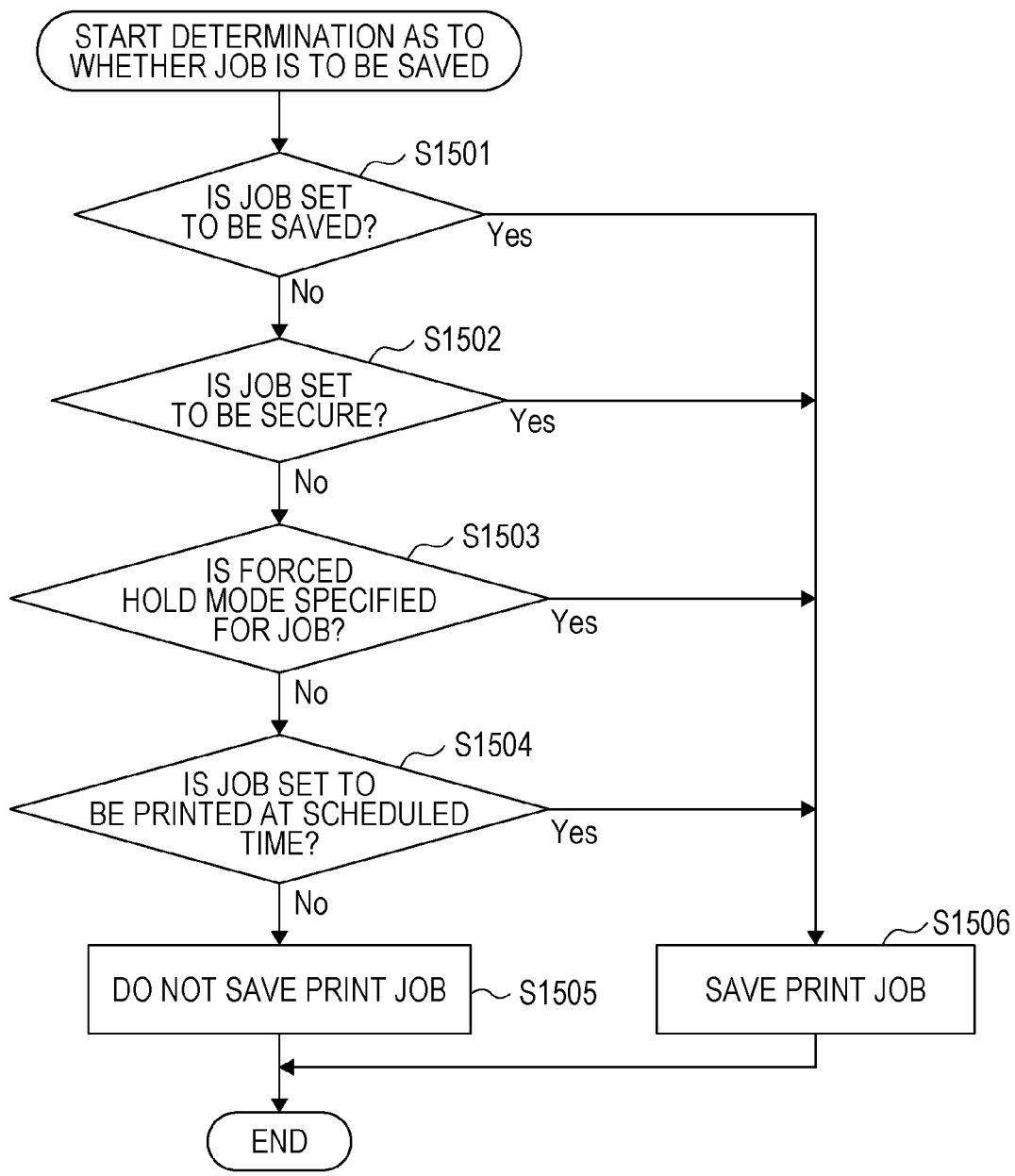
FIG. 15 is a flowchart illustrating a process of determining whether or not a print job is to be saved.

FIG. 15 is a flowchart illustrating details of the process in S1402 to determine whether a print job is to be saved, wherein this process is executed by the system software 301 on the CPU 202 of the image forming apparatus 102.

The job management unit 307 analyzes the print job and determines whether or not the print job is set to be saved (S1501). In a case where the print job is set to be saved, the job management unit 307 determines that the print job is to be saved (S1506). In a case where the print is not set to be saved, the job management unit 307 analyzes the print job to determine whether or not the print job is set to be a secure job or an encrypted secure job (S1502). In a case where the print job is set to be a secure job or an encrypted secure job, the job management unit 307 determines that the print job is to be saved (S1506). In a case where the print job is set to be neither a secure job nor an encrypted secure job, the storage control unit 305 acquires a forced hold setting value stored in the HDD 205 and transfers it to the job management unit 307 via the data management unit. The setting of the forced hold is performed in advance by an administrator of the image forming apparatus 102. In a case where the forced hold is set to ON, the print job submitted to the image forming apparatus 102 is forcibly stored in the HDD 205.

The job management unit 307 determines, based on the forced hold setting value, whether or not the forced hold is set (S1503). If the forced hold is set, the job management unit 307 determines that the print job is to be saved (S1506). In a case where the forced hold is not set, the job management unit 307 analyzes the print job to determine whether or not the scheduled printing is set (S1504). In a case where the scheduled printing is set, the job management unit 307 determines that the print job is to be saved (S1506). In a case where the scheduled printing is not set, the job management unit 307 determines that the print job is not saved (S1505).

FIG. 11B is a diagram showing an example of a bibliographic information list 1101 stored in the HDD 205. The bibliographic information list 1101 includes information indicating date and time 1102 when the print job was submitted, a user name 1103 who submitted the print job, a storage location 1104 where the submitted print job is stored, and a print job name 1105. The bibliographic information list 1101 further includes information regarding print settings 1106, a print job type 1107, a password 1108, a scheduled time 1109, a button name 1110, and a type of the template document 1111. 1121 and 1122 each denote bibliographic information regarding a template document registered according to the first embodiment. 1123 to 1127 each denote bibliographic information regarding a print job submitted according to the present embodiment.

Figure 16A:
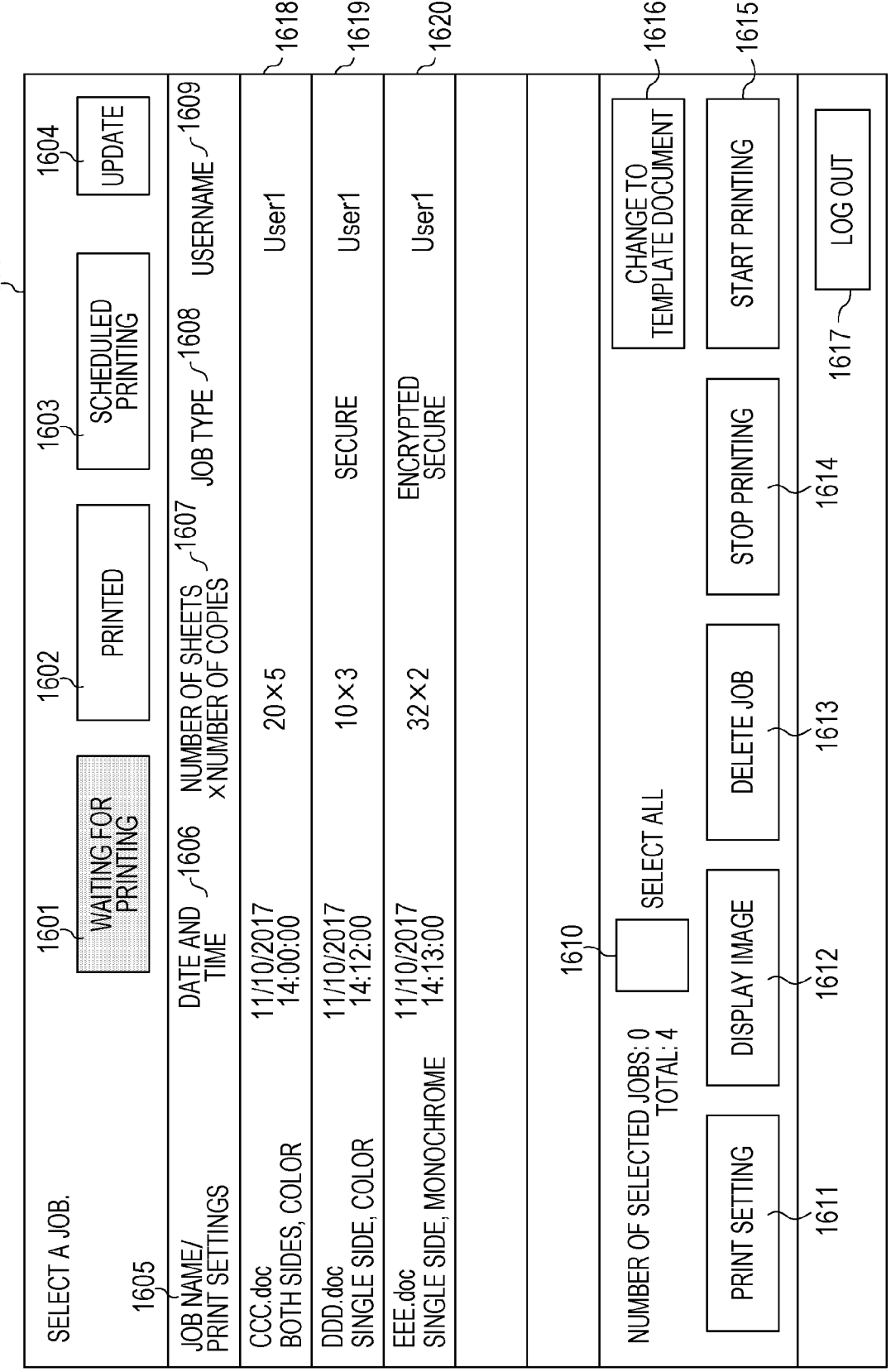
FIG. 16A is a diagram illustrating an example of a screen for displaying a print job list.

FIG. 16A illustrates an example of a print job list screen. On this screen, a user is allowed to operate a held print job. In a case where the user selects a "WAITING FOR PRINTING" 1601, the job management unit 307 acquires a login user name from the authentication unit 303. The job management unit 307 searches the bibliographic information list 1101 using the acquired user name as a search key to find bibliographic information including the user name. In a case where bibliographic information including the login user name is found, the UI control unit 302 displays the acquired bibliographic information on the operation unit 207. For example, in a case where the login user name is User1, bibliographic information 1123 to 1125 are acquired. The bibliographic information 1121 and 1122 are not acquired because the print job type 1107 thereof is a template document. The bibliographic information 1126 is not acquired because the print job type 1107 thereof is scheduled printing. The bibliographic information 1127 is not acquired because the user name 1103 thereof is User2. Each of the acquired bibliographic information is displayed in corresponding one of display areas 1618 to 1620.

When the user selects "PRINTED" 1602, the job management unit 307 displays bibliographic information regarding print jobs that have been printed in the past on a screen (not shown). When the user selects "SCHEDULED PRINTING" 1603, the job management unit 307 searches the bibliographic information list 1201 for scheduled print jobs for each of which a start time of the print process is specified, and displays found scheduled print jobs in a scheduled printing screen 1700. A printing process for each scheduled print job stored in the image forming apparatus is executed at a print start time specified in the printer driver without a print instruction issued by a user. When the user selects "UPDATE" 1604, the job management unit 307 searches the bibliographic information list 1201, and the UI control unit 302 updates the displayed bibliographic information.

1605 denotes a job name/print setting, which is displayed under the control of the UI control unit 302 such that the job name/print settings 1605 corresponding to the print job name 1105 and the print setting 1106 is displayed. 1606 denotes a date and time, which is displayed under the control of the control unit 302 such that date and time corresponding to the date and time 1102 is displayed. 1607 denotes the number of sheets×the number of copies, which is displayed under the control of the UI control unit 302 such that data corresponding to data obtained as a result of analyzing the print job and the print setting 1106. 1608 denotes a job type. In a case where the print job type 1107 is secure, the UI control unit 302 displays "secure" in the job type 1608, while in a case where the print job type 1107 is encrypted secure, the UI control unit 302 displays "encrypted secure" in the job type 1608. For normal jobs, for example, "normal" may be displayed. 1609 denotes a user name, which is displayed under the control of the UI control unit 302 such that a user name corresponding the user name 1103 is displayed.

1618 to 1620 each denote bibliographic information regarding a print job. When a user selects "SELECT ALL" 1610, the UI control unit 302 selects all bibliographic information (1618 to 1620). When the user selects one of the bibliographic information 1618 to 1620 and then selects "PRINT SETTING" 1611, the UI control unit 302 displays a screen (not shown) for changing the print setting for the selected print job. When the user selects one of the bibliographic information 1618 to 1620 and then selects "DISPLAY IMAGE" 1612, the UI control unit 302 displays a screen (not shown) for displaying a preview image of the selected print job. When the user selects one of the bibliographic information 1618 to 1620 and then selects "DELETE JOB" 1613, the job management unit 307 deletes the selected print job. When the user selects one of the bibliographic information 1618 to 1620 and then selects "STOP PRINTING" 1614, if the selected print job is in printing operation, the job management unit 307 stops the printing process. When the user selects one of the bibliographic information 1618 to 1620 and then selects "START PRINTING" 1615, the job management unit 307 executes the selected print job. When the user selects one of the bibliographic information 1618 to 1620 and then selects "CHANGE TO TEMPLATE DOCUMENT" 1616, the job management unit 307 changes the selected print job to a template document. When the user selects "LOG OUT" 1617, the authentication unit 303 performs logout processing, and the UI control unit 302 displays a user authentication screen (not shown) on the operation unit 207.

Figure 18:
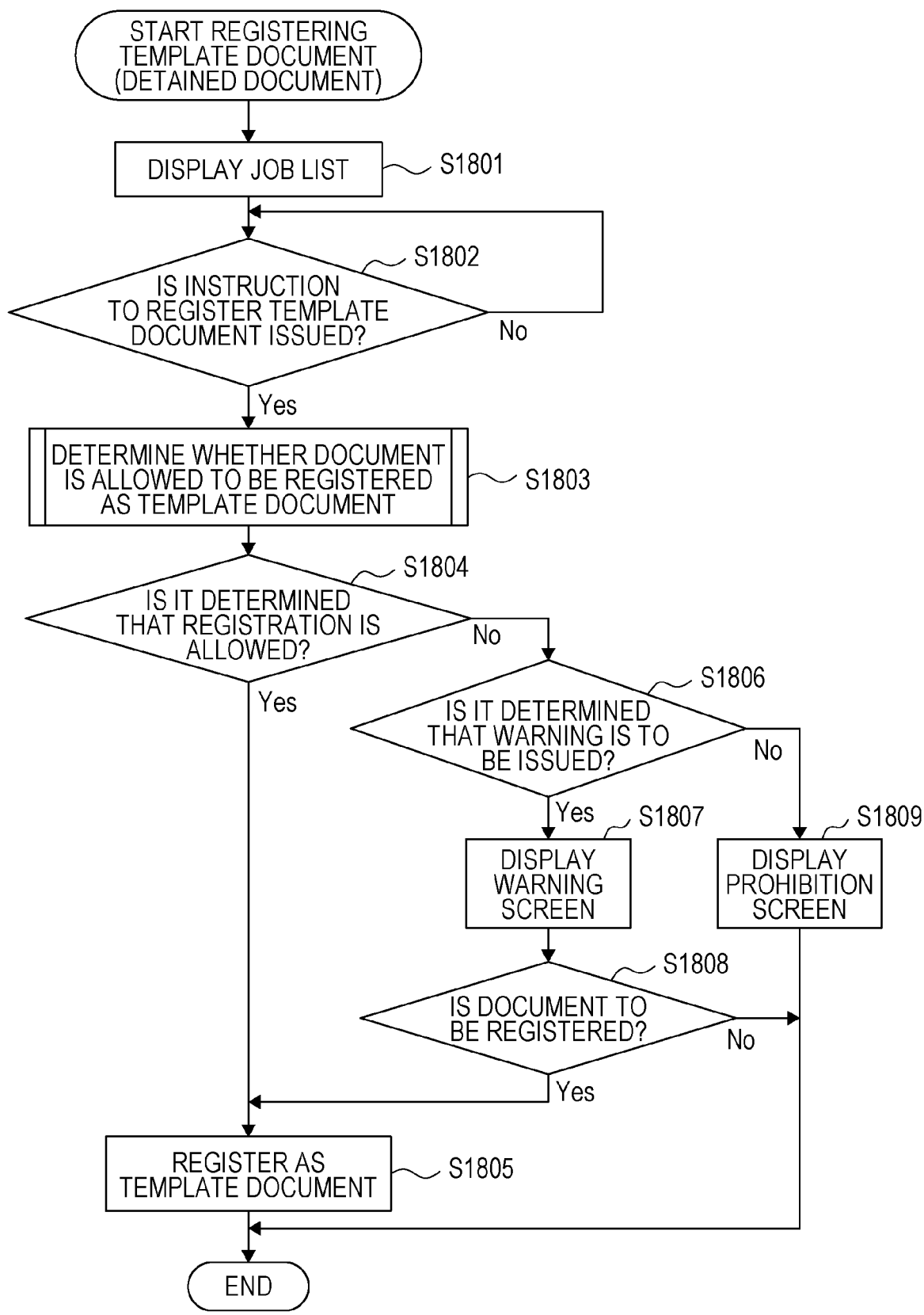
FIG. 18 is a flowchart illustrating a process of registering a template document in a print job.

FIG. 18 is a flowchart illustrating a process of registering a print job as a template document executed by the system software 301 on the CPU 202 of the image forming apparatus 102.

The UI control unit 302 displays the print job list 1600. The UI control unit 302 determines whether or not an instruction to register a template document is issued (S1802). When the user selects a print job (for example, bibliographic information 1618) and then presses the "CHANGE TO TEMPLATE DOCUMENT" button 1616, the UI control unit 302 determines that an instruction to register a template document has been issued. The job management unit 307 determines whether the selected print job is allowed to be registered as a template document (S1804).

In the present embodiment, above-described determination is performed by the CPU 202 of the image forming apparatus 102 according to the process shown in FIG. 7. The job management unit 307 acquires the file size of the selected print job 1618 (S706). Next, the job management unit 307 compares the file size of the document being tried to be registered with the free space available in the storage area for storing documents to be registered as template documents (S707). In a case where the file size of the document is larger than the free storage space, it is determined that the registration is prohibited (S715). Next, the job management unit 307 compares the file size of the document being tried to be registered with the upper limit of the file size allowed to be printed by the image forming apparatus (S708). In a case where the file size of the document is larger than the upper limit, it is determined that the registration is prohibited (S715). Next, the job management unit 307 determines whether the selected print job 1618 is allowed to be registered as a template document (S711). For example, the determination is made based on whether or not the document is password-protected. In a case where the document is not password-protected, it is determined that the document is allowed to be registered as a template document (S712), while in a case where the document is password-protected, it is determined that the document is not allowed to be registered as a template document. In a case where it is determined that the document is not allowed to be registered as a template document, a further determination is performed as to whether a user is allowed to select whether the document is to be registered as a template document (S713). In a case whether the user is allowed to make the selection, it is determined to issue a warning (S714). In a case where the user is not allowed to make the selection, it is determined that the registration is to be prohibited (S715). For example, in a case where the document of the print job 1619 is password-protected, if the template document registrant gives a notification of the password to a user who wants to refer to or print the document, the user is allowed to print it, and thus in this case it is determined that a warning is to be issued.

Figure 16B:
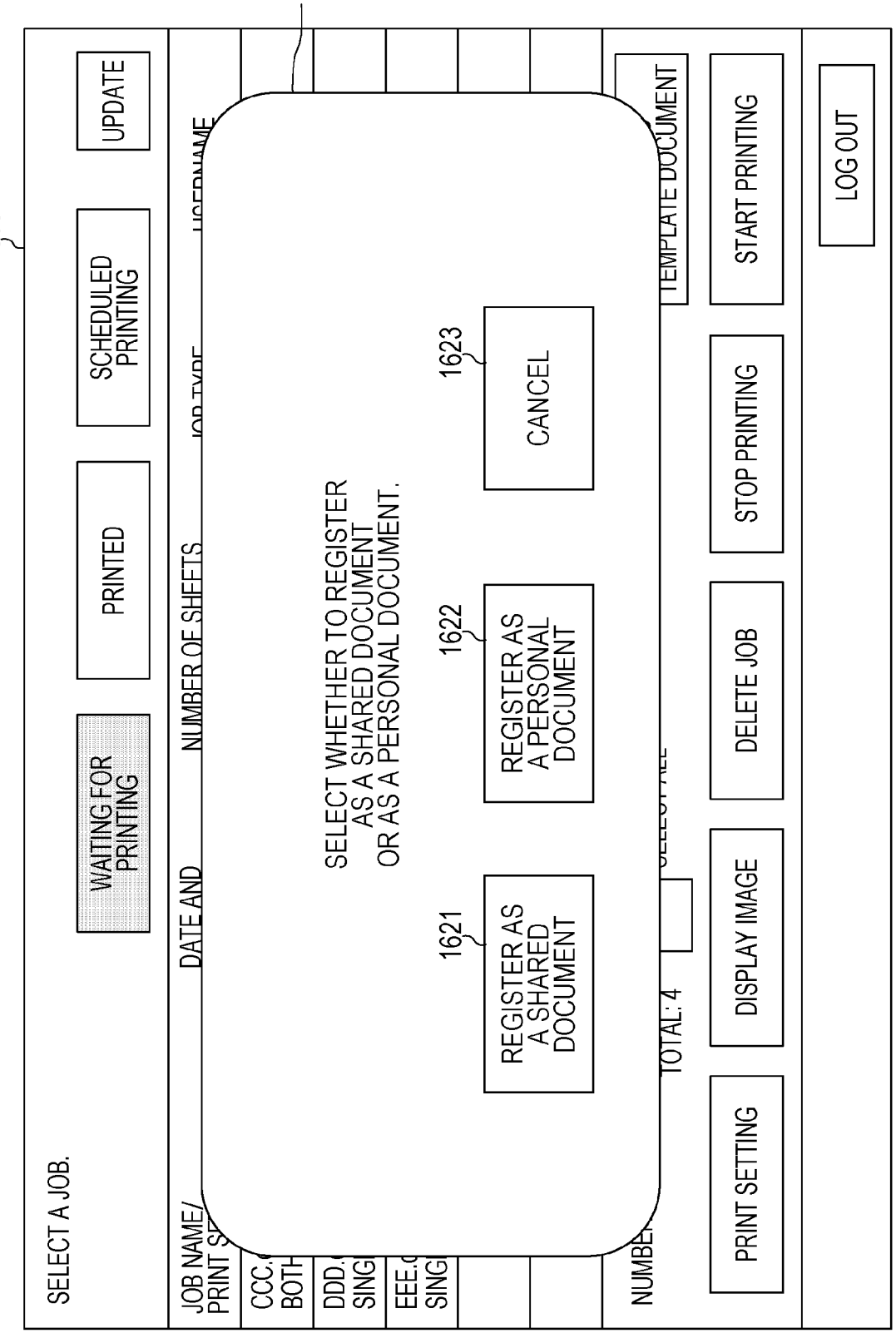
FIG. 16B is a diagram illustrating an example of a screen for confirming a template document.

The job management unit 307 determines whether or not the document is allowed to be registered as a template document according to a result of the above-described determination (S1804). In a case where the registration is allowed, the job management unit 307 registers the print job 1618 as a template document (S1805). When the document is registered as a template document, the template document confirmation screen 1620 shown in FIG. 16B may be displayed such that a user is allowed to select whether the document is registered as a shared document or a personal document, and then the registration may be performed. In a case where the result of the determination in S1804 is that the registration is not allowed, it is further determined whether a warning is to be issued (S1806). In a case where the result of the determination in S1806 is that a warning is to be issued, the job management unit 307 displays a warning screen via the UI control unit 302 (S1807).

FIG. 16C illustrate an example of a warning screen 1600. 1626 denotes a message indicating the content of the warning. A YES button 1627 is a button for registering a template document. A NO button 1628 is a button for not registering a template document.

The job management unit 307 determines whether or not an instruction to register the document is issued on the warning screen (S1808). In a case where the result of the determination in S1808 is that the document is to be registered (that is, in a case where the YES button 1627 is pressed on the warning screen), the job management unit 307 executes the process in S1805 described above. In a case where the result of the determination in S1808 is that the registration is not performed (that is, in a case where the NO button 1628 is pressed on the warning screen), the job management unit 307 hides the message 1626 indicating the warning content and displays a job list screen.

In a case where the result of the determination in S1806 is that a warning is not to be issued but the registration is to be prohibited, the job management unit 307 displays a prohibition screen (S1809).

Figure 16D:
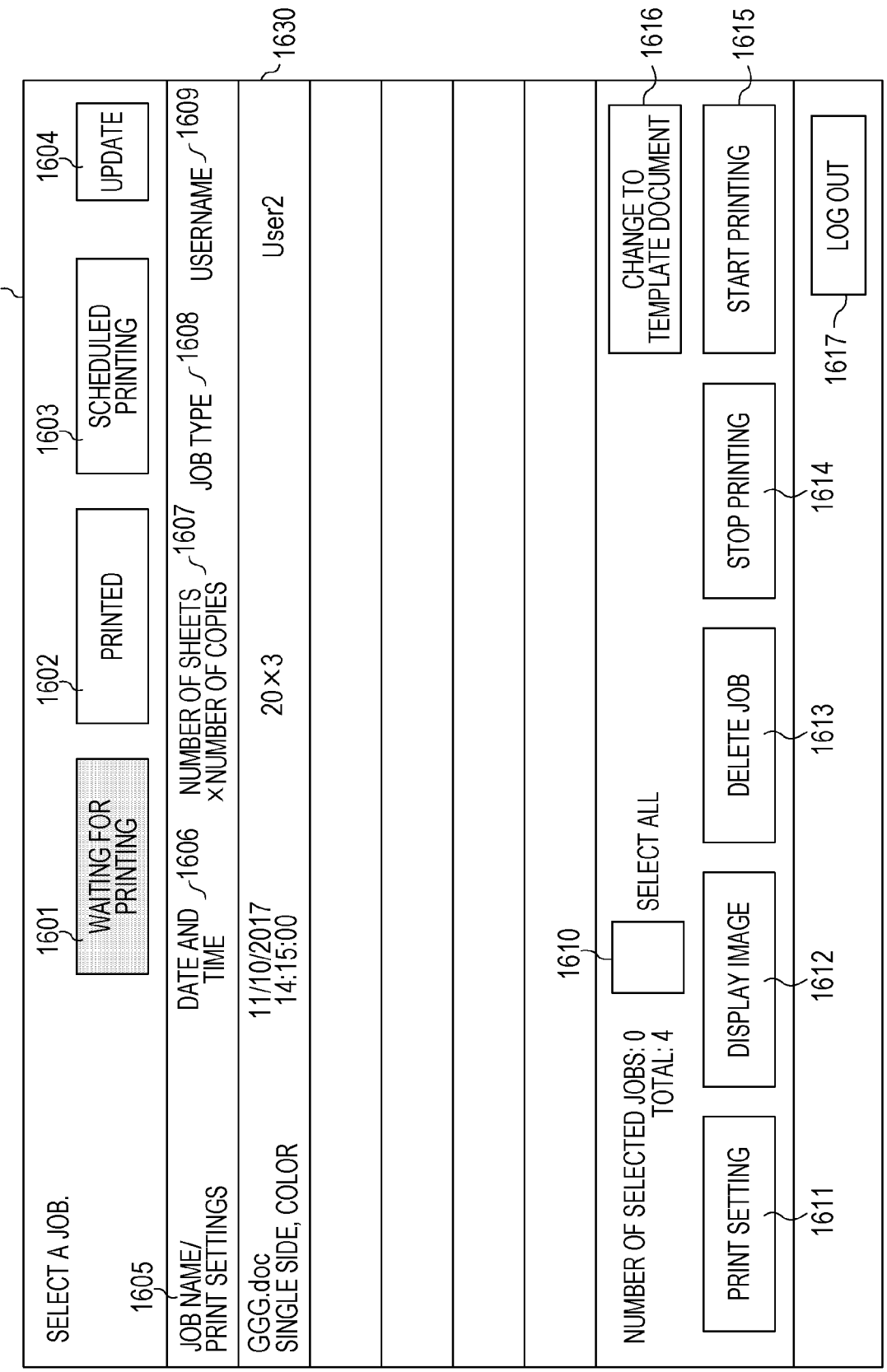
FIG. 16D is a diagram illustrating an example of a screen for displaying a print job list.
Figure 16E:
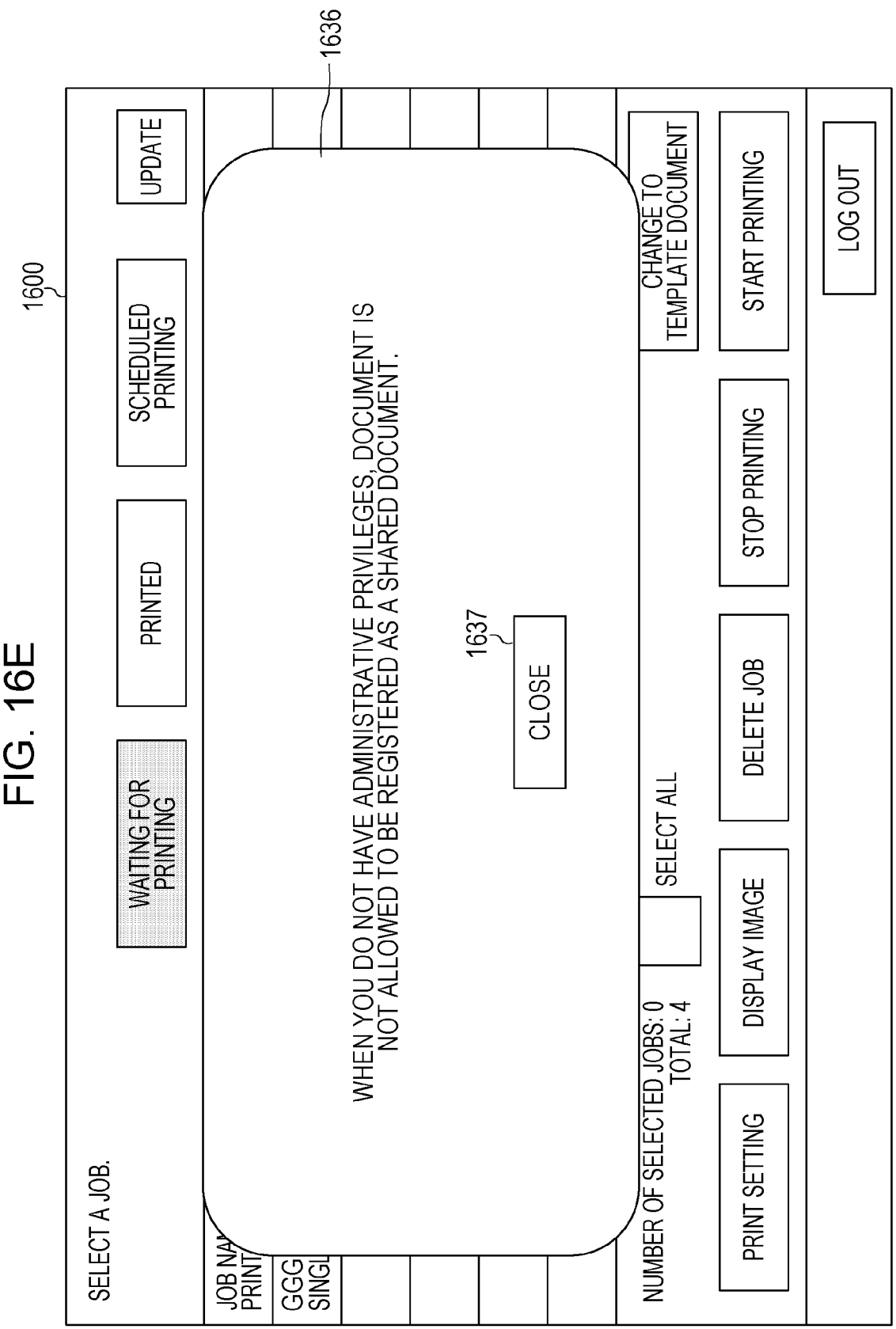
FIG. 16E is a diagram illustrating an example of a prohibition screen.
Figure 16F:
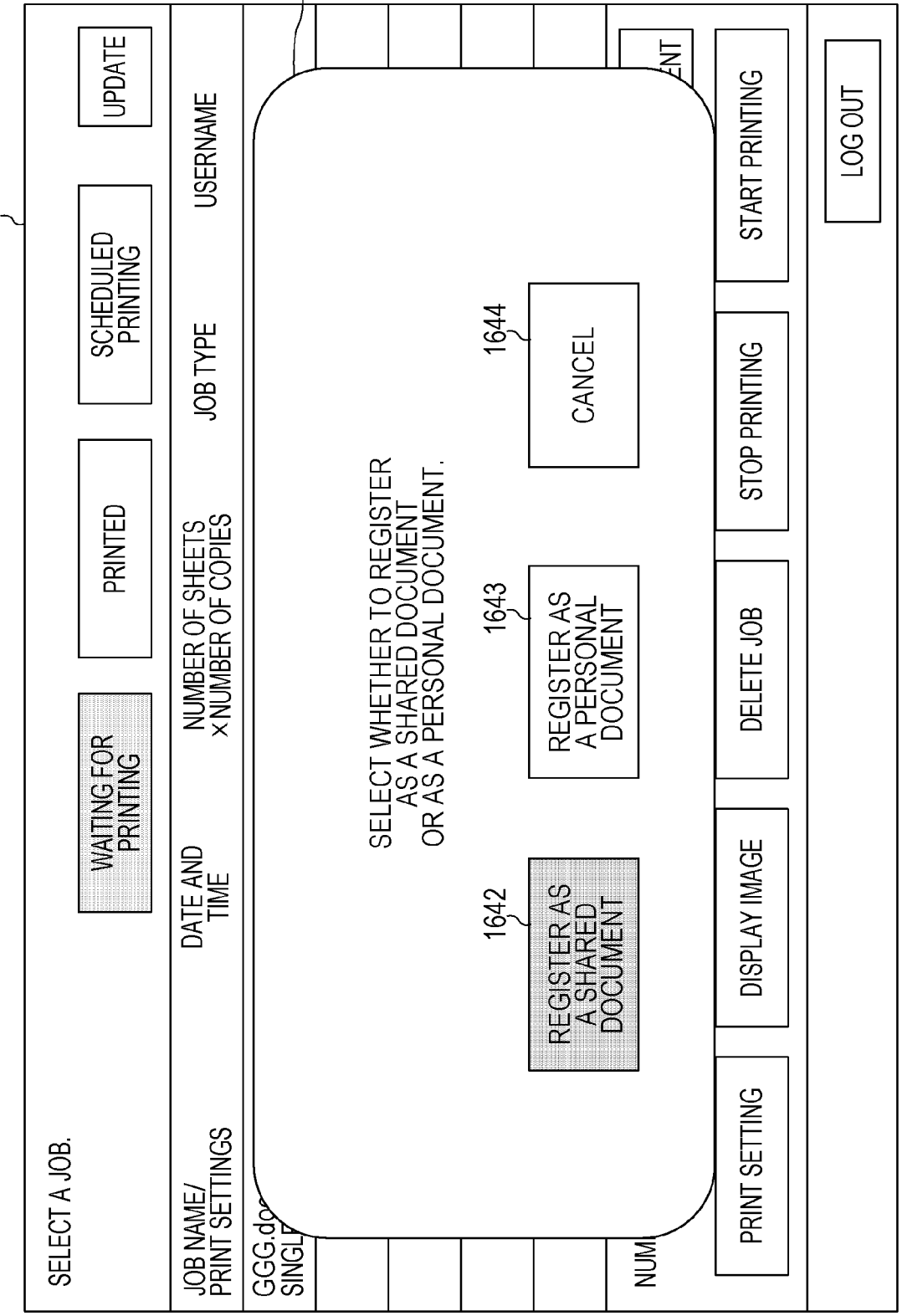
FIG. 16F is a diagram illustrating an example of a screen for confirming a template document.

FIG. 16E illustrates an example of a prohibition screen 1600. 1636 denotes a message indicating the content of the prohibition. A CLOSE button 1637 is a button for closing the message 1636 indicating the content of the prohibition. As an example, let a case be discussed where a user User2, who is a general user without having administrative privileges, logs in using an authentication screen (not shown) on the image forming apparatus 102. Among the bibliographic information described in the bibliographic information list 1101, only the bibliographic information 1127 includes User2 as the user name 1103. Therefore, only the print job 1630 is displayed in the job list 1600 as shown in FIG. 16D. When this print job 1630 is selected, and the "CHANGE TO TEMPLATE DOCUMENT" button 1616 is pressed, and furthermore "REGISTER AS A SHARED DOCUMENT" 1621 is selected, it is determined in S713 and S715 that the registration as the template document is prohibited. This is because if a large number of shared documents are registered by a general user, then a large number of template document icons will be displayed on the home screen, which will cause other users to have inconvenient situations. However, prohibition may be determined not only in the above case, but prohibition may be determined in other cases. When it is determined that the registration is to be prohibited, the screen shown in FIG. 16E is displayed. However, alternatively, a screen such as that shown in FIG. 16F may be displayed in which the "REGISTER AS A SHARED DOCUMENT" button 1642 is grayed out such that a user is not allowed to make registration as a shared document.

FIG. 16G illustrates an example of a prohibition screen 1600. 1638 denotes a message indicating the content of the prohibition. A CLOSE button 1639 is a button for closing message 1638 indicating the content of the prohibition. For example, when a user tries to register a selected print job 1618 as a template document, if it is determined that the file size of this document is greater than the free available storage space (S707), the prohibition screen 1600 shown in FIG. 16G is displayed. In another example, when it is determined that the file size of the document of interest is larger than the upper limit of the file size allowed to be printed (S708), the prohibition screen 1600 is displayed.

FIG. 17A illustrates an example a screen 1700 of a job list of scheduled printing. On this screen, when a schedule print job 1711 is selected and then the "DELETE DATA" button 1709 is pressed, the scheduled print job 1711 is deleted. It is also allowed to press the "CHANGE TO TEMPLATE DOCUMENT" button 1710 after the scheduled print job 1711 is selected. However, the scheduled printing is a function of automatically starting printing when the scheduled time comes, while the template document printing is a function that allows it to print a document that is frequently used and thus registered as a template document, and thus these two functions are different in purpose and are incompatible. Therefore, a warning screen such as that shown in FIG. 17B is displayed.

In the present embodiment, a method has been described in which a print job submitted from the PC 101 to the image forming apparatus 102 is stored and held, and the held print job is changed to a template document. According to this embodiment, when a user tries to register a held document as a template document, the user is informed of a restriction that will occur when the registered document is printed and thus the user can get to know in advance the restriction.

Third Embodiment

In the first and second embodiments, the process for a user to register a document as a template document has been described. In contrast, in a process according to an a third embodiment described below, a user prints a template document registered in the image forming apparatus 102 by operating the home screen 1201 of the image forming apparatus 102.

Figure 19:
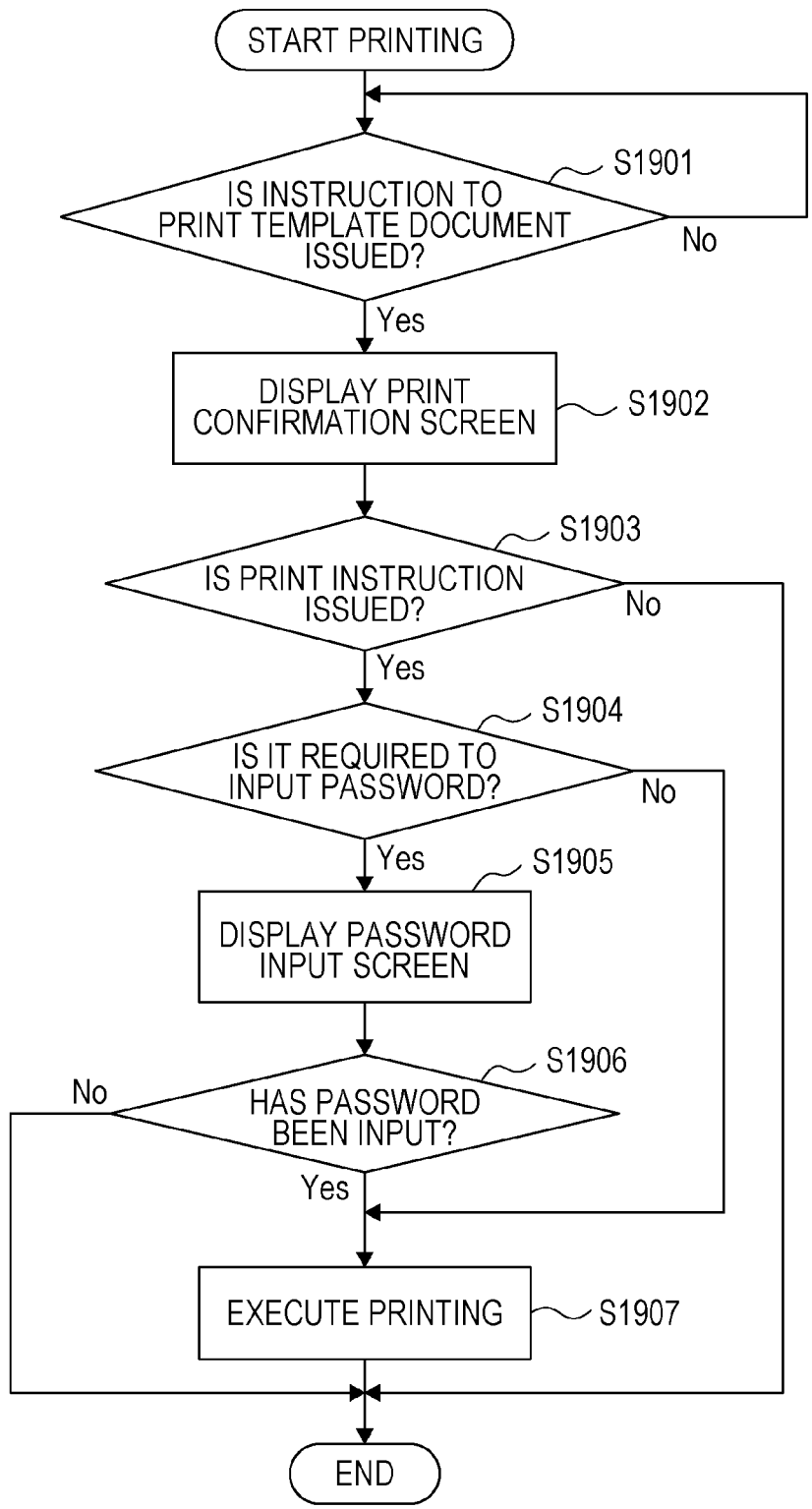
FIG. 19 is a flowchart illustrating a process of printing a template document.

FIG. 19 is a flowchart illustrating a process of printing a template document executed by the CPU 202 of the image forming apparatus 102.

Figure 20:
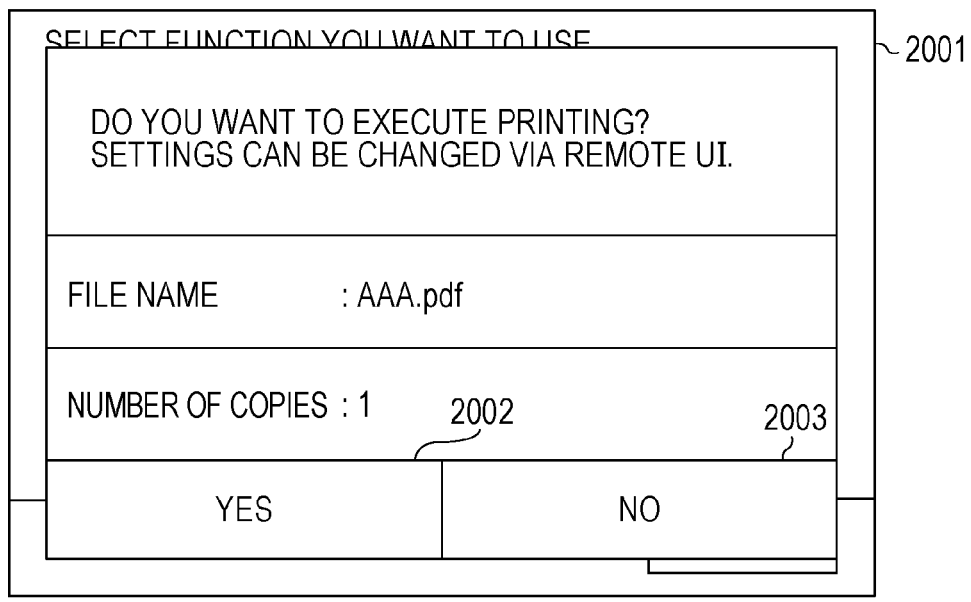
FIG. 20 is a diagram illustrating an example of a print confirmation screen.

The UI control unit 302 waits for an instruction to print a template document to be issued (S1901). For example, when the template document button 1208 on the home screen 1201 is pressed, the UI control unit 302 displays a print confirmation screen 2001. FIG. 20 shows an example of the print confirmation screen 2001. When a YES button 2002 is pressed, printing is executed, but a NO button 2003 is pressed, printing is not executed.

The UI control unit 302 determines whether a print instruction is issued (S1903). In a case where it is determined in S1903 that a print instruction is issued (in a case where the YES button 2002 is pressed), the process proceeds to S1904. In a case where it is determined in S1903 that no print instruction is issued (in a case where the NO button 2003 is pressed), the process is ended. The job management unit determines whether or not a password needs to be entered to print a template document instructed to be printed (S1904). More specifically, in a case where the print job type 1107 is secure or encrypted secure, it is determined that a password is required. In a case where it is determined in S1904 that inputting of the password is required, the UI control unit 302 displays a password input screen (not shown) (S1905). The UI control unit 302 determines whether or not the password has been entered (S1906). In S1907, the job management unit 307 transmits a print instruction to the job control unit 308 (S1907).

In the present embodiment, as described above, the process is performed such that a user prints a template document registered in the image forming apparatus 102 by operating the home screen 1201 of the image forming apparatus 102.

According to the embodiments described above, when a user tries to register a document as a template document, the user is informed of a restriction that will occur when the registered document is printed such that the user can confirm the restriction in advance.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-038671, filed Mar. 10, 2021, and No. 2021-204792, filed Dec. 17, 2021, both of which are hereby incorporated by reference herein in their entirety.

What is claimed is:

1. An information processing apparatus capable of communicating with an image forming apparatus, the information processing apparatus comprising:
one or more memories; and
one or more processors that execute a set of instructions to:
accept a designation of a document to be registered in the image forming apparatus;
receive, at the information processing apparatus from the image forming apparatus, information related to the image forming apparatus;
determine whether the designated document is allowed to be registered based on the received information related to the image forming apparatus and information about the designated document,
in a case where it is determined that the designated document is not allowed to be registered, issue a notification regarding the registration of the designated document,
wherein, in a case where a password is added to the designated document, a warning screen for a user to select whether to continue a process of registering the designated document is displayed, and an instruction to register the designated document is transmitted to the image forming apparatus in response to continuation of the process of registering the designated document having been instructed.

2. The information processing apparatus according to claim 1, wherein the one or more processors further execute the set of instructions to, after the issuing of the notification, provide a screen capable of accepting an instruction to register the document to be registered.

3. The information processing apparatus according to claim 1, wherein in a case where the designated document being tried to be registered is a password-protected document, it is determined that the document is not allowed to be registered.

4. The information processing apparatus according to claim 1, wherein in a case where the document being tried to be registered includes information specifying a start time at which a printing process is to be started, it is determined that the document is not allowed to be registered.

5. The information processing apparatus according to claim 1, wherein in a case where a file size of the document being tried to be registered is larger than a predetermined upper limit, it is determined that the document is not allowed to be registered.

6. The information processing apparatus according to claim 1, wherein in a case where a file size of the document being tried to be registered is larger than a remaining capacity of a document storage area of the image forming apparatus, it is determined that the document is not allowed to be registered.

7. The information processing apparatus according to claim 6, wherein the information related to the image forming apparatus includes information regarding the remaining capacity of the document storage area of the image forming apparatus.

8. The information processing apparatus according to claim 7, wherein the information regarding the remaining capacity of the document storage area of the image forming apparatus is acquired before a registration screen for registering a document in the image forming apparatus is displayed.

9. The information processing apparatus according to claim 1, wherein in a case where it is determined that the designated document is allowed to be registered, a process of registering the designated document is performed by the image forming apparatus.

10. A control method for an information processing apparatus capable of communicating with an image forming apparatus, the control method comprising:
    accepting designation of a document to be registered in the image forming apparatus;
    receiving, at the information processing apparatus from the image forming apparatus, information related to the image forming apparatus;
    determining whether the designated document is allowed to be registered based on the received information related to the image forming apparatus and information about the designated document,
    in a case where it is determined that the designated document is not allowed to be registered, issuing a notification regarding the registration of the designated document,
    wherein, in a case where a password is added to the designated document, a warning screen for a user to select whether to continue a process of registering the designated document is displayed, and an instruction to register the designated document is transmitted to the image forming apparatus in response to continuation of the process of registering the designated document having been instructed.

11. A non-transitory computer readable storage medium on which is stored a computer program for making a computer execute a control method for an information processing apparatus capable of communicating with an image forming apparatus, the control method comprising:
    accepting designation of a document to be registered in the image forming apparatus;
    receiving, at the information processing apparatus from the image forming apparatus, information related to the image forming apparatus;
    determining whether the designated document is allowed to be registered based on the received information related to the image forming apparatus and information about the designated document,
    in a case where it is determined that the designated document is not allowed to be registered, issuing a notification regarding the registration of the designated document,
    wherein, in a case where a password is added to the designated document, a warning screen for a user to select whether to continue a process of registering the designated document is displayed, and an instruction to register the designated document is transmitted to the image forming apparatus in response to continuation of the process of registering the designated document having been instructed.

* * * * *